US008380586B2

(12) United States Patent
Paolini

(10) Patent No.: US 8,380,586 B2
(45) **Date of Patent: *Feb. 19, 2013**

(54) CONSUMER REPRESENTATION RENDERING WITH SELECTED MERCHANDISE

(75) Inventor: Michael A. Paolini, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 702 days.

This patent is subject to a terminal disclaimer.

(21) Appl. No.: 12/331,078

(22) Filed: Dec. 9, 2008

(65) Prior Publication Data

US 2009/0089186 A1 Apr. 2, 2009

Related U.S. Application Data

(63) Continuation of application No. 11/291,473, filed on Dec. 1, 2005.

(51) Int. Cl.
*G06Q 30/00* (2006.01)

(52) U.S. Cl. ...................... 705/27.2; 705/26.7; 705/27.1

(58) Field of Classification Search ............. 705/26–27, 705/26.1–27.2; 715/705–706
See application file for complete search history.

(56) References Cited

U.S. PATENT DOCUMENTS

| | | | | |
|---|---|---|---|---|
| 4,885,844 | A | 12/1989 | Chun | |
| 5,956,525 | A | 9/1999 | Minsky | |
| 6,546,309 | B1 | 4/2003 | Gazzuolo | |
| 7,487,116 | B2 * | 2/2009 | Paolini | 705/26 |
| 2002/0077922 | A1 | 6/2002 | Srinivasan | |
| 2002/0093538 | A1 | 7/2002 | Carlin | |
| 2002/0178061 | A1 | 11/2002 | Lam | |
| 2002/0188372 | A1 | 12/2002 | Lane et al. | |
| 2003/0028436 | A1 | 2/2003 | Razumov | |
| 2003/0110099 | A1 | 6/2003 | Tarjkovic et al. | |
| 2004/0044589 | A1 | 3/2004 | Inoue et al. | |

(Continued)

FOREIGN PATENT DOCUMENTS

| | | |
|---|---|---|
| CN | 1604014 | 4/2005 |
| EP | 1521482 A2 | 4/2005 |

(Continued)

OTHER PUBLICATIONS

Dataglove, Datasuit and Virtual Reality. Advanced Technology for People With Disabilities. Greenleaf, WJ., Author Affiliation: Greenleaf Med Systems, Palo Alto, CA, USA., p. 211-14, USA Publication Date: 1992.

(Continued)

*Primary Examiner* — William Allen

(74) *Attorney, Agent, or Firm* — Matthew W. Baca; Amy J. Pattillo

(57) ABSTRACT

At least one computing system, in a network or stand-alone environment, accesses a consumer representation, wherein the consumer representation comprises a three dimensional model rendered to depict a consumer appearance and movement in each frame of a captured video stream and specified by a selection of sizing measurements detected from a scan of a consumer body shape. The computing system selects at least one merchandise item from among multiple merchandise items each with separate merchandise characteristics. In particular, the computing system selects the merchandise item of a size selected to fit the selection of sizing measurements for the consumer. The computing system renders the merchandise item on each rendered frame of the three dimensional model according to the merchandise characteristics as applied to the sizing measurements, wherein a display of the rendered three dimensional model shows a realistic image of the consumer appearance and movement as captured in the video stream rendering the consumer wearing the selected merchandise item.

15 Claims, 7 Drawing Sheets

U.S. PATENT DOCUMENTS

2005/0131776 A1 6/2005 Perotti et al.
2005/0177463 A1 8/2005 Crutchfield, Jr. et al.
2005/0182693 A1 8/2005 Alivandi et al.
2005/0234782 A1 10/2005 Schackne et al.
2007/0130020 A1 * 6/2007 Paolini .......................... 705/26

FOREIGN PATENT DOCUMENTS

KR 1020010097554 A 8/2001
KR 1020010092993 A 10/2001

OTHER PUBLICATIONS

Briefing: Virtual Dummies. Herald (United Kingdom. Jan. 28, 2004.
Cell Broadband Engine resource Center, copyright International Business Machines Corporation, 2 pages, [online], [accessed on Nov. 29, 2005]. Retrieved from the internet <URL: http://www-128.ibm.com/developerworks/power/cell/>.
Blachford, Cell Architecture Explained, Version 2, 5 pages, [online], [accessed on Nov. 29, 2005]. Retrieved from the internet <URL: http://www.blachford.info/computer/Cell/Cell3__v2.html>.
D'Amora, Bruce, Online Game Prototype, May 13, 2005, copyright International Business Machines Corporation, 4 pages, [online], [accessed on Nov. 16, 2005]. Retrieved from the internet <URL: http:// http://www.research.ibm.com/cell/whitepapers/cell_online__game.pdf>.
Terrain Rendering Engine, May 13, 2005, copyright International Business Machines Corporation, 14 pages, [online], [accessed on Nov. 16, 2005]. Retrieved from the internet <URL: http:// http://www.research.ibm.com/cell/whitepapers/TRE.pdf>.
Pham, et al., The Design and Implementation of a First-Generation CELL Processor, 2005, 3 pages, [online], [accessed on Nov. 16, 2005]. Retrieved from the internet <URL: http:// www-306.ibm.com/chips/techlib/techlib.nsf/techdocs/7FB9EC5D5BBF51ED87256FC000742186/$file/ISSCC-10.2-Cell__Design.PDF >.
3-D Real-Time Clothes Fitting and Makeup Simulator, Toshiba Corporation, Jan. 27, 2004, 3 pages, [online], [accessed on Nov. 16, 2005]. Retrieved from the internet <URL: http://www.temple.edu/ispr/examples/ ex04__02__02.html>.
US Patent 7,487,116, filed Dec. 1, 2005, Michael A Paolini, Office Action, mailing date Mar. 4, 2008, 20 pages.
US Patent 7,487,116, filed Dec. 1, 2005, Michael A Paolini, Notice of Allowance, mailing date Sep. 9, 2008, 9 pages.
Gillies, et al, Efficient Clothing Fitting from Data, Journal of WSCG, vol. 12, No. 1-3, Feb. 2-6, 2004, 8 pages, [online], [accessed on Nov. 16, 2005]. Retrieved from the internet <URL: http://http://wscg.zcu.cz/wscg2004/Papers.sub.--2004.sub.--Full/K47.pdf >.
USA: Intellifit Launches Pilot Programme in Malls, Aug. 9, 2005, 1 page, Intellifit Corporation [online], [accessed on Nov. 29, 2005]. Retrieved from the internet <URL: http:// www.intellifit.com/Intellifit/NewsArticles/Just%20Style%208-9-05.pdf >.
Levi's Extends its '10 second fitting' kiosk market tour, Sep. 6, 2005, 1 page, Intellifit Corporation [online], [accessed on Nov. 11, 2005]. Retrieved from the internet <URL: http://www.intellifit.com/Intellifit/NewsArticles/WiseMarketer%20com%209-- 6-05.pdf >.
About Us, 1 page, Intellifit Corporation [online], [accessed on Nov. 11, 2005]. Retrieved from the internet <URL: http://www.intellifit.com/Intellifit/AboutUs.aspx >.
Product Line Up, Digital Fashion LTD, 2 pages [online], [accessed on Dec. 1, 2005]. Retrieved from the internet <URL:http://www.dressingsim.com/DFL.sub.--en/product/index.html>.

* cited by examiner

CONSUMER REPRESENTATION RENDERING WITH SELECTED MERCHANDISE

CROSS-REFERENCE TO RELATED APPLICATIONS:

This application is a continuation of commonly assigned U.S. patent application Ser. No. 11/291,473, filed Dec. 1, 2005 now U.S. Pat. No 7,487,116, which is hereby incorporated herein by reference.

BACKGROUND OF THE INVENTION

1. Technical Field

The present invention relates in general to improved virtual modeling of merchandise and in particular to virtually rendering a consumer representation wearing at least one merchandise item, where the consumer representation is based on both a video stream capturing the consumer image and sizing measurements and modeling from a body scan of the consumer's body shape.

2. Description of the Related Art

The global apparel market is a major industry, but even with the numerous clothing merchandise options available many shoppers have difficulty finding merchandise that fits. Many shoppers, in an effort to save time, turn to online shopping. Online shopping, however, still suffers from the same problems as catalog shopping and even in-store shopping—a large percentage of merchandise purchased by consumers is then returned to the merchant by consumers because of poor fit. Further, the lack of information about "fit" available from online merchants keeps many consumers from making purchases online or even attempting to shop for wearable merchandise online.

Some online stores, in an effort to aid the shopper in predicting an appearance and fit of a merchandise item will provide multiple photographs of the merchandise item, from different angles, as worn by a mannequin or live model. Other online stores display merchandise items on a generic three dimensional graphical model, where the user can select to adjust different parameters of the generic looking three dimensional graphical model with a static pose and select to rotate the entire generic looking three dimensional graphical model to view the merchandise item as worn from different angles, but with the same pose.

While current photos or generic three dimensional models provide some information about the appearance and fit of a merchandise item, these generic images do not reflect how a merchandise item would actually fit on a consumer or how a merchandise item would change in appearance and fit responsive to movement while worn by the consumer. For example, when a merchandise item is actually tried on by a consumer, the appearance and fit of the merchandise item will adjust responsive to movement depending on the characteristics of the material, such as drape, smoothness, texture and stretch, and responsive to how the garment actually fits on the body shape of the consumer. Further, when a merchandise item is actually tried on by the consumer, shape modifying garments worn under a merchandise item by the consumer will change the appearance and fit of the merchandise item whether the consumer is standing still or moving.

In another example of using technology to help consumers find clothing that may fit, Intellifit (Intellifit is a registered trademark of Intellifit Corporation) has developed a scanning system that is placed in shopping areas and uses low-power radio waves that reflect off a person's skin to detect thousands of data points. From the data points, the system determines a set of metric body measurements for the consumer and provides the consumer with a selection of merchandise items that may fit the consumer, where the merchandise items are selected from merchants partnering with Intellifit in the shopping area. While suggesting a selection of merchandise items from partnering merchants that may "fit" based on metric body measurements may reduce the consumer's time in searching for clothing with a potential to fit the consumer at those merchants, the static body measurement scanning system is still limited to metric body measurement matching alone; the consumer is not provided with information about how the merchandise item will actually appear on or fit the consumer, without the consumer trying on the merchandise item, or about how the merchandise item will appear or fit whether the consumer is standing or sitting or responsive to other movement. Further, the Intellifit system is limited because consumers are limited to receiving clothing suggestions only from those merchants partnering with Intellifit.

Clearly, in view of the foregoing, it is apparent that for a consumer to truly experience a simulated dressing room, there is a need for a method, system, and program to enable a consumer to see a modeling of merchandise on a model based exactly on the consumer in outer appearance and movement. In addition, there is a need to select merchandise items to model on the virtual, three dimensional consumer representation and to provide the virtual, three dimensional consumer representation, whether previously built and stored or captured and built in real time, for access by consumers, vendors, and third party services to model the selected merchandise items in different environments. Further, in selecting merchandise items to model, there is a need to determine "fit" based not only on body scan measurements and merchandise measurements, but also based on how the merchandise item will be worn, such as in layers, how each particular consumer defines fit and how a designer designed a merchandise item to fit.

SUMMARY OF THE INVENTION

Therefore, the present invention provides improved virtual modeling of merchandise and in particular, provides a method, system, and program for virtual rendering of a consumer representation wearing at least one merchandise item, where the consumer representation is based on both a video stream capturing the consumer image and sizing measurements from a body scan of the consumer's body shape and displays the consumer movement captured in the video stream.

In one embodiment, at least one computing system provides a consumer representation system. The consumer representation system includes a selection system that accesses a consumer representation, wherein the consumer representation comprises a three dimensional model rendered to depict a consumer appearance and movement in each frame of a captured video stream and specified by a selection of sizing measurements detected from a scan of a consumer body shape. The selection system selects at least one merchandise item from among multiple merchandise items each with separate merchandise characteristics. In one example, the selection system selects the merchandise item of a size selected to fit the selection of sizing measurements for the consumer. In addition, the consumer representation system includes a selection rendering system that renders the merchandise item on each rendered frame of the three dimensional model according to the merchandise characteristics as applied to the sizing measurements, wherein a display of the rendered three dimensional model shows a realistic image of the consumer appearance and movement as captured in the video stream but the consumer is wearing the selected merchandise item.

In addition, in accessing a consumer representation, a selection system may access the consumer representation or data for generating the consumer representation from a consumer representation database. In addition, in accessing a consumer representation, a selection system may access the consumer representation from a representation capture system of the consumer representation system. The representation capture system accesses previously stored or currently detected data points from a scan of the consumer body shape by a body scanning device and the captured video stream including an image of the consumer. The representation capture system calculates sizing measurements and a three dimensional shape of the consumer from the data points. In addition, the representation capture system graphically maps consumer movement and body language from the captured video stream and extracts, from the captured video stream, facial features, skin texture characteristics, and lighting characteristics. The representation capture system generates the three dimensional model rendered to depict the consumer appearance and movement from the selection of sizing measurements, the three dimensional shape, the graphical mapping of the movement, and the extract information.

A consumer representation includes a range of motion associated with captured movement. The selection system selects merchandise items with characteristics of the size selected to fit the consumer and with sizing measurements to fit the range of motion. The selection rendering system renders the merchandise item on the rendered frame of the three dimensional model according to the merchandise characteristics as applied to the sizing measurements of the consumer and the range of motion depicted.

Performance in displaying the rendered merchandise item on the three dimensional model is directed by a rendering time constraint. The rendering time constraint specifies a maximum time between capture of a frame of the video stream and rendering the corresponding frame with the three dimensional model wearing the particular merchandise item. To meet the rendering time constraint, one or more computing systems implementing the consumer representation system select at least one processor element enabled to meet the rendered time constraint and through the at least one processor element, build the consumer representation through the processor element and render the merchandise item on each rendered frame of the three dimensional model within the rendered time constraint for delivery to a display interface. In one example, the rendering time constraint is set so that the display of the rendering appears to the consumer as if the consumer is looking into a mirror when viewing the rendering at the display interface.

The selection system compiles selection criteria for selecting merchandise items from real time entries by a user and from databases storing merchandise preferences for the consumer, vendor preferences for merchandise item vendors, from third party preferences. The databases are updated responsive to detecting responses by consumers to the rendering of the consumer wearing the merchandise item. A response may include a purchase of the merchandise, a selection to see another view of the merchandise, a request to save the rendering, a request to send the rendering in an electronic communication, and a response to a survey prompted is association with the rendering.

The selection rendering system renders the merchandise item on the three dimensional model placed within a particular display environment. In addition, the selection rendering system may adjust other characteristics of the external appearance of the consumer, such as changing a hair style or applying makeup.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
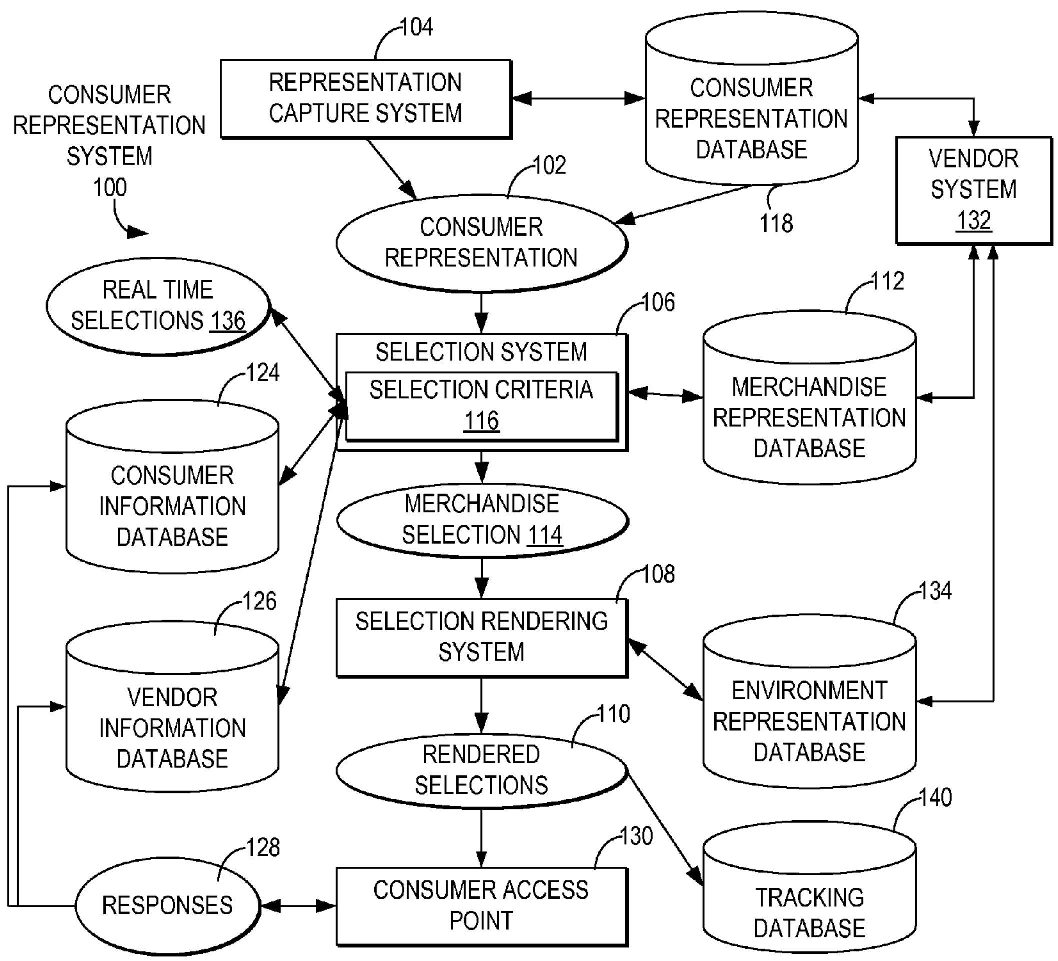
FIG. 1 is a block diagram depicting a consumer representation system for rendering a virtual consumer representation based on video wearing selected merchandise.

With reference now to the figures and in particular, with reference now to FIG. 1, there is depicted a block diagram of a consumer representation system for rendering a virtual consumer representation based on video wearing selected merchandise. It will be understood that FIG. 1 does not imply structural limitations, but is merely illustrative of the flow of data and processing. For example, the systems depicted may be implemented in multiple types of computing systems and may be integrated into a single physical system or groups of physical systems; the databases depicted may be implemented in any type of data storage medium or grouping of data storage media, fixed or portable, accessible through wired, wireless, port or other type of connection locally or over a network and may be implemented using multiple types of data storage structuring.

As an overview, a selection system 106 accesses a consumer representation from either a representation capture system 104 or a consumer representation database 118. Selection system 106 compiles selection criteria 116 from real time selections 136, consumer information database 124, and vendor information 126. Applying selection criteria 116, selection system 106 selects at least one merchandise item representation, illustrated as merchandise selection 114, from merchandise representation database 112. A selection rendering system 108 receives consumer representation 102 and merchandise selection 114 and renders consumer representation 102 wearing merchandise selection 114 as rendered selections 110. In addition, selection rendering system 108 may access an environment representation database 134 and select a different display environment in which to place the rendered consumer representation wearing the selected merchandise item. Selection rendering system 108 directs output of rendered selections 110 to a consumer access point 130. From consumer access point 130, responses to viewing rendered selections 110, purchases, merchandise items selections and survey responses are transferred as responses 128 to consumer information database 124 and vendor information database 126 for storage and to aid selection system 106 in determining selection criteria 116 and making merchandise items selections in the future.

As used throughout, a consumer may include, but is not limited to, a single person or multiple people. In addition, the consumer may include other movable entities that can be dressed or accessorized, such as, for example, animals, robots, or cars. A merchandise item may include, but is not limited to, one or more wearable items. It is important to note that where services are provided to a consumer, a user other than the consumer indicated in the selected consumer representation may request to access and receive rendered selections 110 for the consumer representation of another. For example, a parent may request rendered selections 110 using a consumer representation for a child.

In addition, as used throughout, a vendor may include, but is not limited to, a designer, a seller, a business partner, a promoter, a consultant, a distributor, a manufacturer, or other entity other than the consumer. A store front may include, but is not limited to, a physical store front, a catalog ordering center, an online store, or other avenue through which merchandise items are accessible. An online store may include, but is not limited to, any website or other network accessible data.

More particularly, a selection system 106 receives a consumer representation 102. In one embodiment, consumer representation 102 includes a three dimensional virtual consumer representation clip with specified body measurements and modeling based on a body scan. In another embodiment, consumer representation 102 includes at least one digital video clip of a consumer and a file of body scan data of the consumer as detected by a body scanning device.

Selection system 106 may receive all or a portion of consumer representation 102 from representation capture system 104. In addition, selection system 106 may receive all or a portion of consumer representation 102 from consumer representation database 118.

Figure 2:
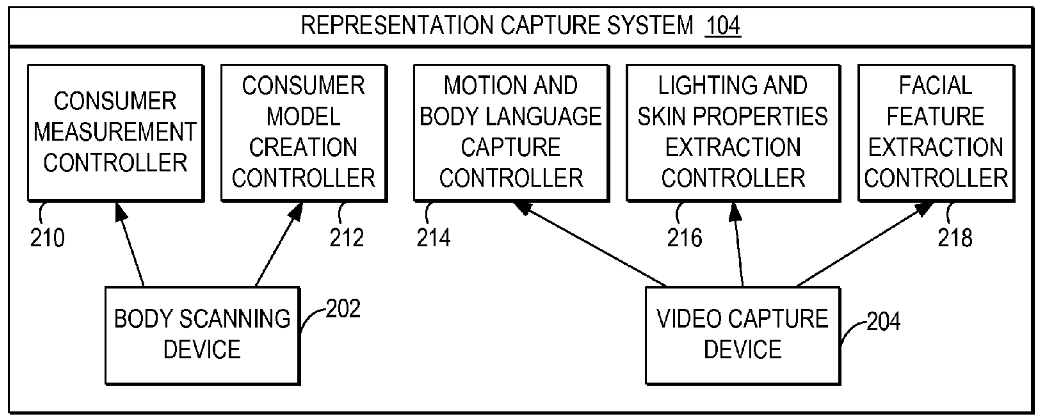
FIG. 2 is a block diagram depicting examples of components of a representation capture system.

In one example, referring now to FIG. 2, representation capture system 104 receives body scan data from a body scanning device 202. In one example, body scanning device 202 uses low power radio waves that reflect off skin to detect multiple data points representative of a consumer outline; the body scanning system may convert the data points into sizing measurements and a model or pass the data points to representation capture system 104 for analysis and conversion into sizing measurements. In the example, representation capture system 104 includes consumer measurement controller 210 to analyze and create consumer sizing measurements from the scanned data points and consumer model creation controller 212 to analyze and create a three-dimensional model of the consumer from the scanned data points. In another embodiment, consumer measurement controller 210 and consumer model creation controller 212 may be integrated into body scanning device 202. In particular, body scan data may capture consumer sizing measurements for the consumer body shape in different positions and consumer measurement controller 210 and consumer model creation controller 212 may create consumer sizing measurements and models that dynamically adjust to reflect the detected actual adjustments to sizing and modeling when a consumer is in different positions. For example, as a consumer reaches one's arms in the air, the shape and measurement of arm muscles may adjust; for some consumers this adjustment may be significant and may affect the actual range of motion that a consumer would be provided when wearing a particular merchandise item. It will be understood that other types of scanning systems enabled to detect and model an outline of a consumer's image may be implemented and that representation capture system 104 may include additional or alternate systems for detecting, analyzing, and creating at least a portion of consumer representation 102.

In addition, still referring to FIG. 2, in one example, representation capture system 104 receives captured video of a consumer from a video capture device 204. Multiple systems within representation capture system 104 separately analyze the captured video and to build a three dimensional consumer model that represents the moving image of the consumer in the captured video, including the features of the consumer's external appearance as visible and as inferred from the captured video. In the example, a motion and body language capture controller 214 may detect the motion and body language movements within the captured video image for specifying motion and body language in consumer representation 102. In addition, in the example, a lighting and skin properties extraction controller 216 extracts the external lighting and skin properties of a consumer from the captured video image for specifying rendering of skin properties in consumer representation 102. Further, a facial features extraction controller 218 detects facial measurements and properties and identifies facial features of a consumer from the captured video image for specifying video based facial rendering in consumer representation 102. In particular, the facial rendering in consumer representation 102 may include the actual captured video image or graphically represented image of the captured video image. It will be understood that motion and body language capture controller 214, lighting and skin properties extraction controller 216 and facial features extraction controller 218 may functionally operate as separate components or a single component of representation capture system 104.

In addition, it will be understood that representation capture system 104 may implement additional or alternate components in analyzing captured video.

Figure 3:
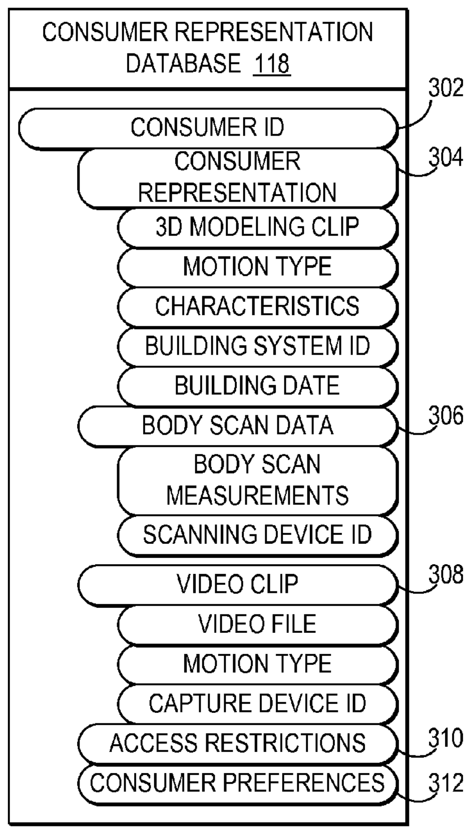
FIG. 3 is a pictorial representation illustrating example data types of entries within a consumer representation database.

As representation capture system 104 builds a three dimensional consumer model, which also includes gathering information which will enable selection rendering system 108 to render a three dimensional representation of a consumer, representation capture system 104 may also integrate the sizing measurements and modeling determined from the body scan data by consumer measurement controller 210 and model creation controller 212 to correctly model portions of the model not visible or detectable from the captured video image. It will be understood that representation capture system 104 may receive the video from multiple types of video capturing devices in multiple types of formats. In addition, it will be understood that a body scanning device 202 and video capture device 204 may be integrated into single system environment. Further, it will be understood that body scanning device 202 and video capture device 204 and the controllers described in representation capture system 104 may be implemented in separate physical locations by separate vendors and distributed as separate devices and controllers. [0040] Returning now to FIG. 1, as representation capture system 104 builds a three dimensional consumer model, representation capture system 104 may store a clip of the model in consumer representation database 118 for future access. For example, referring now to FIG. 3, a pictorial representation displays types of entries which may be included or referred to within a consumer representation database. As illustrated, a consumer ID 302 references data stored for each particular consumer. It will be understood that consumer ID 302 may be implemented using multiple types of identifiers. In addition, it will be understood that the data types illustrated in consumer representation database 118 are illustrative of the types of data that may be accessible.

For a particular consumer, consumer representation database 118 may include previously stored consumer representations built by a single representation capture system or different representation capture systems, as illustrated by consumer representation entry 304. In the example, consumer representation entry 304 includes a three dimensional consumer model clip, a type of motion associated with the model clip, types of characteristics associated with the model clip, the representation capture system or other system that built the model clip and the date and time of building. By specifying the type of motion for an entry and storing multiple entries, for example, one model clip may show a consumer walking as if on a fashion show runway; another model clip may show the consumer standing and sitting. By specifying the types of characteristics associated with the model clip, each model clip may indicate the type of background or environment in which the model clip is rendered. For example, one model clip may be built with the consumer in front of a blue screen or other blocked background that allows for easy merging of the consumer representation into a different video or graphical environment. A consumer, vendor, or selection system 106 may select a particular model clip based on the type of motion, background or other features.

In another example, the types of characteristics associated with a model clip may identify other types of body characteristics. For example, a consumer may pose for body scanning and video capture for wearing different types of body modifying merchandise, such as slimming underwear, that when worn, change the measurements, shape, range of motion, and other characteristics of the body. Different consumer representations stored for a particular consumer may identify the types of body modifying merchandise worn, so that a particular merchandise item may be modeled on one or more consumer representations as adjusted by body modifying merchandise. In another example, a consumer may pose for body scanning and video capture at different times of year, where the consumer's body shape tends to change at the same times each year due to predictable changes in diet, exercise, or other factors that influence body shape. Different consumer representations stored for a particular consumer may identify the predicted consumer representation during a particular season so that if a consumer is purchasing clothing for a winter season, the consumer representation typical for the winter season may be selected from among the multiple consumer representations for a particular consumer.

In addition, in another example, the types of characteristics and system that builds the model clip may identify consumer representations where the consumer's actual representation is modified in some way. For example, different vendors may access a consumer representation and then provide a new, modified consumer representation. In one example, a vendor who specializes in appearance modification, such as a hairstylist, plastic surgeon, makeup vendor, or others may modify a consumer representation to show the impact that an appearance modification service would have on a consumer and enable the consumer to then virtually merchandise items on the modified consumer representation. In another example, other vendors, such as an exercise service provider, may adjust the consumer representation to provide modeled goals for the consumer to encourage participation in an exercise program. Further, a vendor of body modifying merchandise may modify a consumer representation to show the impact of wearing particular types and sizes of body modifying merchandise.

It is important to note that a built consumer representation and rendered selections 110 may be saved and transmitted in multiple types of formats. Thus, a model clip refers generally to a sequence of three dimensional modeling frames, playable in sequence at a particular rate, to model the same movements and appearance as captured in a video stream of the consumer image. The model clip may integrate all or portions of the sizing measurements detected by consumer measurement controller 210, the consumer model created by consumer model creation controller 212, the motion and body language detected by controller 214, the lighting and skin properties extracted from captured video by lighting and skin properties extraction controller 216, and the facial features extracted from captured video by facial feature extraction controller 218.

In addition, as illustrated, consumer representation database 118 may include one or more body scan data entries 306 and video clip entries 308. In the example, body scan data entry 306 includes the body scan measurements, scanning device identifier, and date. Video clip entry 308 includes the video file, a motion type, the capturing device identifier, and a date. It will be understood that additional or alternate types of information may be stored for body scan data entry 306 or video clip entry 308. In addition, it will be understood that for each of the types of data detected, created, or extracted by representation capture system 104, separate types of entry may be stored for each of these types of data for a particular consumer. Further, it will be understood that other types of image representation data may be accessible from consumer representation database and that entries may represent data accessed from a third party service, such as an access to third party web site that provide access to video clips that include a consumer representation.

It is important to note that by storing multiple consumer representation entries over time, a third party service provider may access the stored consumer representation and provide the consumer with additional services, such as a health focused service provider, fashion consulting service provider, or other service provider that would benefit in providing the service from access to the consumer representations. Further, a service provider may access historical consumer representations to monitor consumer progress within a service plan.

Further, a consumer representation may include access restrictions, as illustrated at reference numeral 310. Access restrictions may include, for example, authorization and authentication requirements, subscription limitations, payment requirements, transmission requirements, and other limitations on the access to and storage of data in consumer representations database 118. Access restrictions may be applied by the consumer, another user, a vendor, a service provider, or other entity. It will be understood that additional or alternate types of restrictions may be applied to a consumer representation, particular portions of a consumer representation, or particular entries within consumer representation database 118.

In addition, a consumer representation may include consumer preferences, as illustrated at reference numeral 312. In particular, consumer preferences 312 may include, for example, preferences for selecting between multiple entries depending on the context in which the consumer representation is accessed. It will be understood that additional or alternate types of preferences may be stored for the consumer representation.

Referring back to FIG. 1, representation capture system 104 may detect the captured video in real time, but access the body scan data or analyzed sizing measurements and model for a consumer from consumer representation database 118. In another example, representation capture system may detect new sizing and model measurements, but access a video clip or previously built three dimensional consumer model from consumer representation database 118 and adjust the three dimensional consumer model with the new sizing and model measurements. Further, in yet another example, if a video clip or body scan data, instead of a built three dimensional model, are passed to selection system 106 in consumer representation 102, a selection rendering system 108 may build the three dimensional model and render selected merchandise on the three dimensional model using the video clip and body scan data.

In addition, as illustrated, one or more vendor authorized systems for one or more vendors, such as vendor system 132, may access consumer representations from consumer representations database or store consumer representations in consumer representations database 118. In one example, vendor system 132 may provide consideration for access to one or more consumer representation entries in consumer representation database 118. In another example, vendor system 132 may receive payment for searches of or accesses to consumer representations in consumer representation database 118 by another vendor or third party service provider. Alternatively, a consumer or other service provider may directly receive consideration from another vendor or third party service provider. Further, a consumer may provide consideration to a third party service provider for access to consumer representation database. Exchanged consideration may include, but is not limited to, a payment per access, a payment for a set number of accesses, a payment for access over a particular period of time, or an exchange of services.

Figure 4:
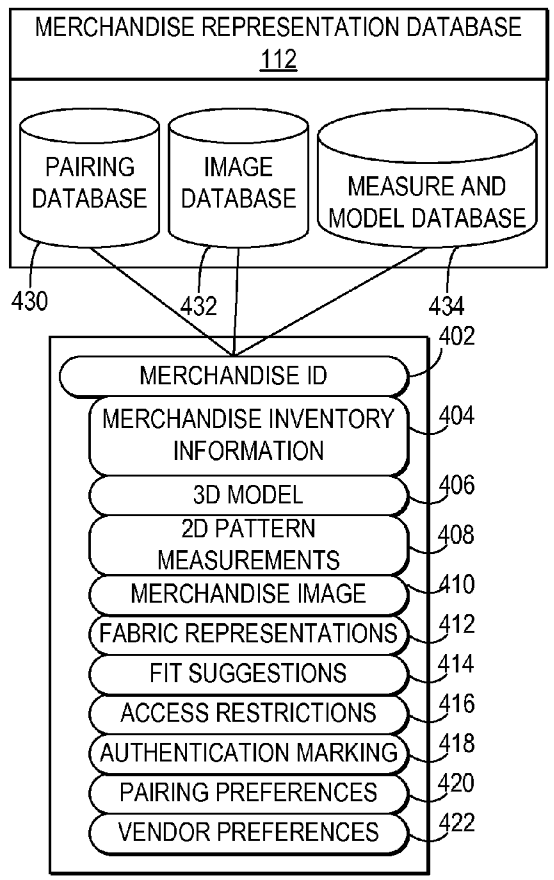
FIG. 4 is a pictorial representation depicting example data types of entries within a merchandise representation database.

In the example in FIG. 1, selection system 106 passes a merchandise selection 114 to selection rendering system 114. Merchandise selection 114 includes at least one representation for at least one merchandise item selected from merchandise representation database 112. In addition, merchandise selection 114 may include suggestions for other merchandise items to pair with the selected merchandise item. In one example, as illustrated in FIG. 4, a merchandise representation accessible from merchandise database 112 may include multiple types of data. In addition, it will be understood that the data types illustrated in merchandise representation database 112 are illustrative of the types of data that may be accessible, however, additional or alternate types of data may also be implemented.

As illustrated in FIG. 4, merchandise representation database 112 may include accesses to multiple independent or joined databases. In the example, the types of databases accessed include a pairing database 430 with entries specifying pairing preferences and rules set by a particular vendor or multiple vendors, an image database 432 with photo or video based images of a merchandise item, and measure and model database 434 with measurement, modeling, and fit data for a merchandise item. In one example, to illustrate data included in a merchandise representation, a data query of the databases illustrated may result in the entry identified by a merchandise identifier (ID) 402. Merchandise ID 402 may include one or more types of identifiers and in particular, may facilitate naming identifier types from multiple disparate types of merchandise inventory identification systems. It will be understood that additional or alternate types of data may be accessible for a merchandise representation.

In addition, as illustrated a merchandise representation includes merchandise inventory information as depicted at reference numeral 404. Merchandise inventory information may include, for example, a name, type, style, designer and other information that identifies a merchandise item. Further, merchandise inventory may include promotional items associated with the merchandise item, such as slogans, advertising displays, and music. In addition, it will be understood that additional or alternate types of inventory information identifying a merchandise item may be included.

A merchandise representation may also include at least one 3D model, as illustrated at reference numeral 406 and at least one 2D pattern representation, as depicted at reference numeral 408. The 3D model may be detected from a scan or build of a 3D graphical representation of the merchandise item. In particular, the 3D model may model both the dimensions and construction of a merchandise item. In addition, the 3D model may model the response of a merchandise item, based on fabric type, construction, and other factors, to different types of movement and model the range of movement of the merchandise item on different sizes model frames. A separate 3D model and 2D pattern representation may be included in a merchandise representation for each size offered of the merchandise item or a separate merchandise representation may be created for each size offered of the merchandise item. It will be understood that different types of 3D models and 2D pattern representations may be included in a merchandise representation.

In addition, for a merchandise representation, a merchandise image may be included, as illustrated at reference numeral 410. A merchandise image may include one or more still photographic images of a merchandise item of different quality and size. In addition, a merchandise image may include one or more video images of a merchandise item, showing one or more features of the merchandise item. In particular, it is advantageous to provide a real image of a merchandise item for display along with a graphically rendered image of a merchandise item to increase consumer confidence that the graphically rendered image is representative of the actual merchandise item.

For each merchandise representation, a fabric representation is included, as illustrated at reference numeral 412. The fabric representation may merely indicate the type of fabric or other material used to construct a merchandise item. In addition, the fabric representation may include, for example, texturized graphic or photo samples of the fabric in one or more colors offered. Further, the fabric representation may include characteristics of the fabric when worn or characteristics of the fabric when washed or dry cleaned. Fabric representations may include suggestions on rendering the merchandise representation on the consumer representation. It will be understood that additional or alternate types of information about the materials used in a merchandise item may be specified.

In addition, each merchandise representation may include fit suggestions, as depicted at reference numeral 414. Fit suggestions may include indications added to or referring to the 3D model or 2D pattern measurements of how different portions of a merchandise item should fit and may indicate a range of motion available with for different fit characteristics. In particular, where a particular merchandise item has specific, unique, or proper fit characteristics, the designer or vendor may specify the fit suggestions, such that selection system 106 is able to more effectively select merchandise items meeting the consumer fit preferences and selecting rendering system 108 is able to effectively render the merchandise item to represent actual fit of the merchandise item on the three dimensional consumer representation.

Different sets of fit suggestions may be specified based on current fit trends. For example, one set of fit suggestions may specify a fit where the merchandise item is worn as a layer based on the current layering style trends and other set of fit suggestions may specify a fit where the merchandise item is not worn as a layer. In another example, one set of fit suggestions may specify a fit for a current waist line style trend that features lower cut waist lines where the fit suggestions specify where the waist line should fit for different movements to avoid an improper fit.

In addition, fit suggestions may be tailored to the type of merchandise item. For example, a purse designed for carrying a small dog may include fit suggestions specifying size limitations for the dog with both minimum sizing and maximum sizing. In another example, a pair of glasses designed with supports for a consumer with a low eye bridge may specify the bridge sizing supported.

Further, each merchandise representation may include access restrictions, as illustrated at reference numeral 416. Access restrictions may include, for example, authorization and authentication requirements, subscription limitations, payment requirements, transmission requirements, and other limitations on the access to and storage of data in merchandise representations database 112. Access restrictions may be applied by a vendor, a designer, a trademark holder, a service provider, or other entity. It will be understood that additional or alternate types of restrictions may be applied to a merchandise representation or particular portions of a merchandise representation.

In addition, each merchandise representation may include one or more authentication markings, as depicted at reference numeral 418. An authentication marking may include a digital signature, digital watermark, or other digital marking that is placed on the merchandise representation by selection rendering system 108 to authenticate the origin of the merchandise representation. For example, a designer may specify an authentication marking and a particular vendor may specify a separate authentication marking; when selection rendering system 108 renders the merchandise item, the authentication marking is added to the consumer representation in a manner such that the authenticity and origin of the merchandise representation is verifiable and traceable. It will be understood that additional or alternate types of merchandise representation authentication may be implemented.

Additionally, each merchandise representation may include pairing preferences, as illustrated at reference numeral 420. Pairing preferences may include vendor or designer preferences for suggested merchandise to combine or not to combine with the merchandise item. Suggested merchandise combinations may include specific merchandise items or may generally include types, colors, fabrics, sizes, lengths, brands, and other merchandise descriptors. Further, pairing preferences may include rules for pairing the merchandise item with other merchandise items. In one example, a vendor may specify pairing preferences based on detecting combinations of merchandise with the current merchandise item that may have been purchased. In another example, a vendor may specify pairing preferences based on agreements to promote the merchandise items of a particular vendor or brand.

Further, pairing preferences may include preferences for pairing merchandise items to be worn by different consumers. For example, if a merchandise item is a wedding dress for a consumer who is looking for bridal wear, the pairing suggestions may include suggestions for cuts, brands, and colors of tuxedos and tuxedo accessories for the groom. In another example, if a merchandise item is the purse designed for carrying a small dog, a pairing suggestion may include matching collar or sweater for the dog, but may also suggest other merchandise item accessories, such as matching shoes, for a consumer carrying the dog purse. It will be understood that additional and alternate types of ensemble preferences may be specified by a vendor, designer, or other entity.

In addition, each merchandise representation may include general vendor preferences, as depicted at reference numeral 422. In one example, where multiple colors are offered for a merchandise item, vendor preferences may specify a default color or one or more preferred colors for offering. In addition, it will be understood that other preferences related to selecting a dynamic merchandise representation, pairing the merchandise with other merchandise, vending the merchandise item, and rendering the merchandise item, may be specified in vendor preferences 422.

Returning to FIG. 1, in one embodiment, the one or more vendor authorized systems for one or more vendors, such as vendor system 132, supply the merchandise representations represented as accessible through merchandise representation database 112. In one example, vendor system 132 may provide consideration for selection system 106 to search the vendor's selections in merchandise representation database 112. In another example, vendor system 132 may receive payment for searches of or accesses to merchandise representations in merchandise representation database 112.

Selection system 106 selects merchandise selection 114 from among merchandise representation database 112 based on selection criteria 116 and in view of the sizing measurements and model measurements for the consumer specified in consumer representation 102. In particular, the sizing and model measurements, including motion related measurements, may enable selection system 106 to quickly determine a size or ranges of sizing and particular lines or cuts of merchandise from merchandise representation database 112 and then apply selection criteria 116 to further narrow the potential selections. In addition, in particular, where different sizing measurements are available for different consumer positions, the range of motion and fit suggestions for a merchandise item may be compared with the different sizing and model measurements to further specify sizing of merchandise items for a particular consumer.

Selection system 106 may access and compile selection criteria 116 from multiple sources. In one example, sources depicted include real time selections 136, consumer information database 124 and vendor information database 126. It will be understood that selection system 106 may access additional or alternate sources in compiling selection criteria 116.

In one example, real time selections 136 may include selections entered by a user interfacing with a web site, store front kiosk, or other application through which selection criteria 116 related information is entered or selected. Selection criteria may include, for example, entry of a consumer ID to select which consumer representation to access, a particular consumer representation selection, merchandise related selections, environment related selections and rendering related selections. A user may include a consumer, a purchaser, a vendor, a third party service, or other entity enabled to effect selection criteria 116.

Figure 5:
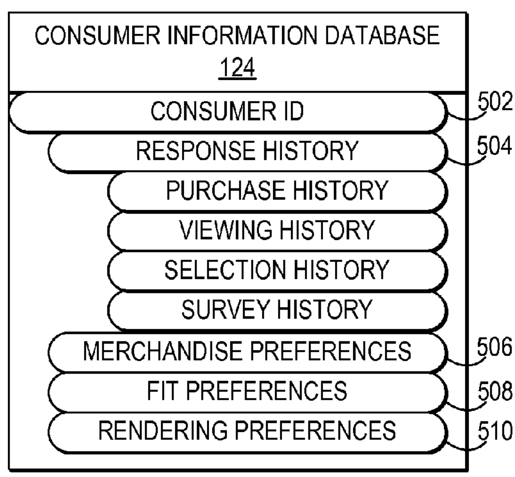
FIG. 5 is a pictorial representation illustrating example data types of entries within a consumer information database.

In addition, in one example, consumer information database 124 may include consumer preferences and consumer history. In one example, as illustrated in FIG. 5, a consumer information entry accessible from consumer information database 124 may include multiple types of data. In addition, it will be understood that the data types illustrated in consumer information database 124 are illustrative of the types of data that may be accessible, however, additional or alternate types of data may also be implemented.

As illustrated in FIG. 5, consumer information database 124 may include consumer information entries for a single or multiple consumers. Each consumer representation is identified by a consumer ID 502. Consumer ID 502 may include one or more types of identifiers and in particular, for a particular consumer, may match consumer ID 302 of FIG. 3. Further, consumer representation database 118 and consumer information database 124 may be integrated into a single database with data referenced by the consumer ID. Moreover, the entry for consumer ID 502 depicted in FIG. 5 may be representative of data queried and compiled from multiple separate database systems accessible to selection system 106.

In one example, each consumer information entry may include response history 504. Response history 504 may include, for example, a purchasing history, in relation to purchasing merchandise items from one or more vendors; viewing history of the consumer in relation to viewing consumer representations fitted with merchandise items; selection history of the consumer in relation to merchandise items selected by the consumer in some way, whether at a store front or online; and survey history of the consumer in filling out surveys, whether at a store front or online. In addition, response history 504 may include other information indicative of previous consumer purchasing preferences and history. For example, response history 504 may include survey responses provided by a user after actually trying on a merchandise item that indicate whether the merchandise item fit the consumer as expected based on rendered selections 110 or whether the merchandise item fit different from the expected item fit based on rendered selections 110.

In addition, in the example, each consumer information entry may include merchandise preferences 506, fit preferences 508, and rendering preferences 510. Merchandise preferences 506 may include consumer specified rules for selecting merchandise and preferences related to any type of category or descriptor of merchandise. For example, a consumer may specify preferences related to price range, color, fabric, designer, and types of garments. Fit preferences 508 may include consumer specified rules and measurement based preferences for fit. Fit factors may include, but are not limited to, lengths, range of motion, tightness, stretch, drape, and wrinkling. For example, a consumer may specify a preference for a particular actual inseam fit or actual pant length. In another example, a consumer may specify a preference for merchandise items to fit tighter than the vendor specified fit suggestions. Rendering preferences 510 may indicate environment selection preferences and may point to specific environments accessible to the consumer. In addition, rendering preferences 510 may indicate particular display interfaces, communication methods, and other output related preferences. For example, the consumer may select a rendering preference to always email the consumer with a copy of rendered selections 110 if the rendering is initially provided at a store front.

Figure 6:
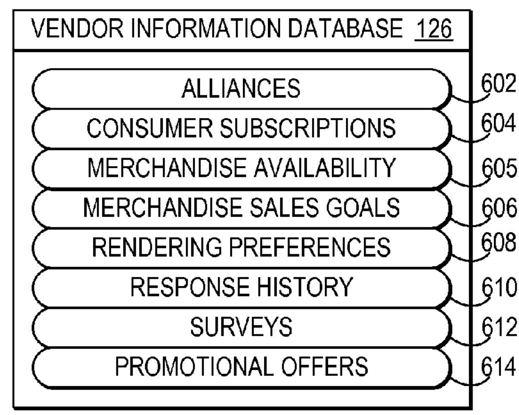
FIG. 6 is a pictorial representation depicting example data types of entries within a vendor information database.

Returning to FIG. 1, in the example, vendor information database 126 may include vendor preferences and vendor history. In one example, as illustrated at FIG. 6, a vendor information entry accessible from vendor information database 126 may include multiple types of data. In addition, it will be understood that the data types illustrated in consumer information database 124 are illustrative of the types of data that may be accessible, however, additional or alternate types of data may also be implemented.

As illustrated in FIG. 6, vendor information database 126 includes vendor information for a particular vendor or group of vendors. It will be understood that vendor representation database 126 may also include separate information for different vendors. In the example, a vendor information entry includes indications of vendor alliances 602, where both the allied vendors and the rules for merchandise pairing are provided.

In addition, in the example, a vendor information entry includes consumer subscriptions 604. A consumer may subscribe to a vendor or third party service provider to receive periodic renderings of the consumer representation in selected merchandise. For example, a consumer may subscribe to automatically receive an email of rendered selections 110 with each new season of merchandise rendered in the consumer representation.

Further, in the example, a vendor information entry also includes merchandise availability 605. Merchandise availability 605 may indicate actual availability or reference the data storage systems that store inventory availability for a single or multiple merchants and for a single or multiple store front or online stores.

In the example, a vendor information entry also includes merchandise sales goals 606. A vendor may specify sales goals for merchandise and specify rules for setting selection criteria 116 based on sales goals. For example, a vendor may set a rule to always select one of three sweaters from merchandise representation database 112, as further specified by consumer preferences, where the vendor has set a goal to sell a particular number of those three sweaters on a particular day or other period of time.

In addition, in the example, a vendor information entry includes rendering preferences 608. Vendor rendering preferences may include or require particular environments for rendering particular types of merchandise or particular consumer's representations. Further, vendor rendering preferences may include preferences about the output interface to which rendered selections 110 are sent. Additionally, where real time video is captured and rendered selections 110 are output to consumer access point 130 in real time, rendering preferences 608 may include preferences for acceptable delays between the capture and the rendering and select workload distribution and payment plans for when the delay is unacceptable.

Further, in the example, a vendor information entry also includes response history 610. Response history 610 may include similar additional types of data to the response history data types illustrated with reference to response history 504 of FIG. 5. Response history 610, however, may include statistical modeling for response history for multiple consumers.

Further, although not depicted, where a user is different from the consumer depicted in consumer representation 102, selection system 106 may access preferences and history set by the user. For example, user preferences may indicate a price range preference for purchasing merchandise items for the consumer. In another example, user history may include multiple named ensembles previously created by the user for selection in future renderings.

Returning now to FIG. 1, selection criteria 116 gathered by selection system 106 may include rules for selecting a single merchandise item, an ensemble or merchandise items or a series of merchandise items, for example. In addition, selection system 106 may include specified rules for determining and applying selection criteria 116. An ensemble of merchandise items may include merchandise from a single or multiple designers or vendors, selected to be rendered together. A series of merchandise items, or of ensembles, may include an ordered series of merchandise items to be rendered on the consumer representation in order and changed at particular periods of time or responsive to other inputs.

In particular, in selecting merchandise items for an ensemble or in modeling a particular merchandise item, such as a top coat, merchandise selection 114 may include multiple merchandise items to be layered in rendering. In selecting the layers, rules for selecting layering pieces to meeting fit requirements and suggestions may be implemented. In one example, a maximum fabric thickness as it affects range of motion when layered may be specified in the rules for selecting merchandise items to layer under a topcoat. In one example, selection system 106 may specify the layering order. In another example, selection rendering system 108 may automatically layer merchandise items based on the type of item. For example, selection rendering system 108 may automatically layer a belt through pant loops.

In selecting merchandise selection 114, selection system 106 may include all or portions of the information gathered for each selected merchandise representation from merchandise representation database 112. For example, merchandise selection 114 may include both the data needed for rendering the merchandise item and for displaying a video image of the merchandise item. In addition, selection system 106 may include merchandise representations for merchandise items to be rendered and merchandise representations for merchandise items to be placed in a selectable list of pairing recommendations, wherein upon user selection of one of the suggestions, the rendered selections may be updated to include the suggested merchandise item.

Selection rendering system 108 receives consumer representation 102 and merchandise selection 114, renders consumer representation 102 wearing merchandise selection 114, and outputs the rendering as rendered selections 110. It will be understood that selection rendering system 108, in rendering selected items on the video representation of a consumer, may implement multiple types of rendering and mapping processes to render merchandise selection 114 on consumer representation 102 as if the consumer were actually wearing the merchandise when the video image of the consumer was captured. In particular, selection rendering system 108 may determine, from the merchandise representation for a selected merchandise item and the body measurements for the consumer, not only the appearance and fit of the merchandise item as worn by the consumer, including fabric texture and layering, but also the appearance and fit of the merchandise item as adjusted for movement, range of motion, and layering, such as the sway, gaping, loosening, tightening, wrinkling, or smoothing of a merchandise item as a consumer moves, further effected by the layering of selected merchandise items. It will be understood that the level of detail in the merchandise representation for the selected merchandise affect the level of detail in the rendering.

In rendering consumer representation 102 wearing merchandise from merchandise selection 114, selection rendering system 108 is able to render a merchandise item so that a consumer can purchase the merchandise item with confidence in a good fit; however, selection rendering system 108 may also render a merchandise item to reveal to the consumer that the merchandise item selected by the consumer is ill fitting. In particular, selection rendering system 108 may include graphical enhancement to point to portions of the rendered merchandise item that do not match the fit suggestions for the merchandise item or the fit preferences of the consumer and to specify the reason for the lack of fit, such as a pant leg being 1 inch too short or that for certain types of movement a pant waist for a pair of pants modeled on the consumer moves below a suggested waist line. In addition, selection rendering system 108 may determine and recommend alteration adjustments to a merchandise item to improve fit, where the adjustments may be graphically rendered with the consumer representation and in a printable instruction format. Further, selection rendering system 108 may communicate with selection system 106 to adjust selection criteria 116 to identify better fitting merchandise items based on determining an ill fit in the actual rendering of the consumer representation wearing the selected merchandise item.

In addition, in rendering consumer representation 102 wearing merchandise selection 114, selection rendering system 108 may concurrently render multiple consumer images within consumer representation 102 or merged from multiple consumer representations, where each consumer image is wearing the same selection of merchandise items or different selections of merchandise items. Advantageously, by rendering multiple consumer images in a single display interface, consumers may view themselves together for purposes of coordinating outfits and accessories. In one example, the consumer images for the multiple members of a wedding party may be rendered concurrently, with each member wearing the same merchandise item in a size adjusted for each member. In another example, the consumer images of the members of a family may be rendered concurrently with each member wearing different merchandise items, to preview coordination between outfits to be worn when taking a family portrait. In yet another example, the consumer images of a couple may be rendered concurrently where the images are adjusted to indicate a height comparison due to adjustments in selected footwear. In a further example, the consumer images of consumer auditioning for a cast may be rendered together wearing the merchandise items selected for costuming to see how the consumer looks in the costuming including movement and mannerisms in the costuming. It will be understood that the examples provided are merely illustrative of the advantage of rendering multiple consumer images together wearing merchandise items and that additional or alternate applications of rendering multiple consumer images together wearing merchandise items may be implemented.

Further, in rendering consumer representation 102 wearing merchandise selection 114, selection rendering system 108 may also render the consumer carrying items that the consumer normally carries. For example, consumer fit preferences 508 may specify types of items that the consumer normally carries, whether externally, such as a handbag or backpack, or within pockets, such as a set of keys, wallet, or phone. Consumer fit preferences 508 may include measurement characteristics of the items or the characteristics may be accessed from merchandise representation database 112 or another data source. In another example, a consumer may select "carry" items from an interface that are included in real time selections 136. The "carry" items are included in merchandise selection 114. Selection rendering system 108 renders the consumer carrying the items, such as a set of keys in a pocket of a merchandise item, so that the consumer can view how the merchandise item will fit as the consumer typically wears clothing and uses pockets of clothing, for example.

In addition, in rendering consumer representation 102 wearing merchandise selection 114, selection rendering system 108 may render the combination within a selected environment from environment representation database 134. An environment may include a background image, music, video, and other displayable elements. A vendor, third party service provider, consumer, user or other entity may specify environment representations within environment representation database 134. Selection system 106 may specify an environment selection in merchandise selection 114, selection rendering system 108 may select an environment representation or another service provider may select an environment representation for selection rendering system 108.

In selecting an environment from environment representation database 134, the environment may be selected to correlate with the expected environment for wearing merchandise selection 114. In one example, a vendor may specify environment representations including video clips and three dimensional renderings of wedding related images, where a wedding merchandising vendor may provide the multiple wedding related images into which to position consumer representations wearing the wedding merchandising items.

In another example, a consumer may select to access an environment representation of the actual environment in which the consumer will wear the selected merchandise items. For example, a consumer may select to access photo of a ballroom where an event will be hosted that the consumer is to attend; the consumer can then see themselves in the event location wearing the selected merchandise, and even interacting with other consumers, to preview the merchandise item color and style within the event venue and determine whether the merchandise item is appropriate.

In addition, in selecting an environment from environment representation database 134, a vendor may pay to have a particular environment representation displayed in correlation with specific types of merchandise items or a consumer may pay to have a particular environment representation displayed. In one example, where merchandise selection 114 includes beach related clothing and accessories, a vendor may contract for an environment representation used by selection rendering system 108 of a video image of a particular resort operated by the vendor, where the consumer viewing rendering selections 110 could select to find out more information about the resort displayed in the background. In another example, where merchandise selection 114 includes previews of a new fashion line, a consumer may pay to have the consumer representation rendered in the new fashion line with the environment representation of the runway on which the new fashion line previewed.

Further, in selecting an environment from environment representation database 134, portions of the environment representation may include positions for placing advertising, including both graphical, video, and music. A vendor may negotiate to place advertising in the environment representation, such as negotiating to place a billboard advertisement within a graphical billboard within a background image of an environment representation. In another example, a vendor may negotiate to place music and video of the artist in the environment representation, where the merchandise selection 114 includes a merchandise item associated with or promoted by the artist.

An environment representation may include actual environment attributes, such as lighting and weather, which can be applied to the consumer representation by selection rendering system 108. For example, in an environment representation including an outdoor beach area, a type of lighting specified with the environment representation is applied to consumer representation 102 rendered wearing merchandise selection 114. In another example, in an environment representation including a weather effect, such as wind, rain, or fog, selection rendering system 108 renders consumer representation 102 wearing merchandise selection 114 and effected by the weather effect.

Further, in rendering consumer representation 102 wearing merchandise selection 114, selection rendering system 108 may also consumer representation 102 with other types of external appearance adjustments. For example, consumer representation 102 may be rendered with adjustments to makeup or hair style. In particular, beauty product vendors and salons may provide representations of new hair styles or makeup colors that can be rendered on consumer representation 102.

Moreover, in rendering consumer representation 102 wearing merchandise selection 114, selection rendering system 108 may offer to vendors the option to advertise additional merchandise items, and in particular accessories. For example, a vendor may provide consideration for selection rendering system 108 to render consumer representation 102 wearing merchandise selection 114 and an accessory, such as a jewelry item, from that vendor. In another example, rendering preferences 510 for a consumer may indicate that the consumer wears eyeglasses and a preference for receiving renderings with potential eyewear purchase selections; selection rendering system 108 or a third party service provider may offer an eyewear vendor the opportunity to have the vendor's eyewear rendered on the representations of those consumers expressing a preference for eyewear.

Selection rendering system 108 outputs rendered selections 110 for access at consumer access point 130. Consumer access point 130 may include a local display interface, a remote display interface, an email communication, a web site window, or other output interface enabled to receive and play rendered selections 110. Selection rendering system 108 may output rendered selections 110 in real time video streaming, delayed broadcast or a playable video clip, for example. In addition, selection rendering system 108 may control output of rendered selections 110 to a display location via a direct or network connection or to a data storage location. Further, selection rendering system 108 may transmit rendered selections 110 via an electronic communication, such as an electronic mail, and instant message, a streaming video message, or other video enabled electronic communication type. Moreover, where rendered selections 110 or portions of rendered selections 110 may be output to a tactile detection output interface. For example, tactile detection output interface may be adjusted to indicate the texture of the merchandise items in rendered selections 110.

In addition, consumer access point 130 may include a printer enabled to print one or more frames of rendered sections 110. In one example, a print vendor may provide a service that selects particular frames from rendered selections 110 and produces a multi-page book of images, prints one or more frames on a t-shirt, or controls a print output onto other types of printable materials. In one example, a vendor may select to generate rendered selections 110 for each consumer on a mailing list with each consumer wearing selected merchandise items and print one or more frames of rendered selections 110 for a personalize bulk mailing advertising the selected merchandise items.

It is important to note that rendered selections 110 includes a three dimensional rendering of at least one consumer image wearing at least one merchandise item, but may also include suggested merchandise item pairings, suggested alterations, vendor information, advertiser information, and other information specified for display or other type of output at consumer access point 130.

Further, a vendor may specify, for example surveys 612 in a vendor information entry of vendor information database 126, where surveys 612 may include surveys or web site references to surveys for consumers to fill out in response to rendered selections 110. In one embodiment, a vendor may specify for selection rendering system 108 to require the recipient at consumer access point 130 to fill out a portion or all of a survey before enabling access to view rendered selections 110. Responses to surveys, distributed as responses 128, are stored in consumer information database 124 and vendor information database 126.

In addition, a vendor may specify promotional offers 614 in a vendor information entry of vendor information database 126. Selection system 106 may use promotional offers as selection criteria, particularly where a consumer specifies criteria for sale or promotional items. Further, selection system 106 may attach applicable promotional offers 614 to rendered selections 110 for output at consumer access point 130.

Further, at consumer access point 130, a consumer may respond to viewing or receiving rendered selections 110. For example, a consumer may select to view rendered selections 110, view portions of rendered selections 110, purchase the selected merchandise within rendered selections 110, place a bid for purchase of the selected merchandise within rendered selections 110, fill out a survey of preferences related to rendered selections 110, save rendered selections 110, email rendered selections 110, request to adjust one or more of the merchandise items in an ensemble, select to add the merchandise selections to a wish list, or make other selections related to rendered selections 110. Any of these types of interactions may be passed as responses 128 to consumer information database 124 and vendor information database 126. In addition, as a consumer interacts with consumer access point 130, selection system 106 may detect responses 128 and dynamically adjust any remaining selection or make additional selections based on consumer responses to rendered selections 110. Further, by storing consumer interactions with rendered selections in consumer information database 124, a history of consumer preferences is built without requiring a consumer to specifically designate preferences for storage in consumer information database. Further, by storing consumer interactions with rendered selections in vendor information database 126 interactions gathered from multiple consumers may indicate statistics for sizing preferences, fit preferences, fabric preferences, fabric coloring preferences, favored styles, disfavored styles, and other information that may aid the vendor in specifying selection criteria and in creating future merchandise lines. Further, other vendors may be provided access to vendor information database 126 in exchange for consideration, such that a vendor may receive compensation for gathering consumer responses.

In one example, representation capture systems 104, selection system 106, and selection rendering system 108 are implemented in a system or distributed among a system enabled with processing power sufficient so that as the video image used to build consumer representation 102 is captured in real-time, selections of merchandise are made and applied to consumer representation 102 and rendered selections 110 is streamed to a display interface with a virtually undetectable delay. The result is that if the consumer is looking at the display while the video image of the consumer is being captured, the consumer sees oneself in the display as if looking in a mirror, but seeing oneself wearing the merchandise selected by selection system 106. As the consumer moves around while a video image is captured and converted by representation capture systems 104 into a three dimensional model, the consumer views how the merchandise would respond to the movements as if the consumer were actually wearing the merchandise when the video image is captured. A consumer might view this "fashion mirror" at a home computer equipped with a video capture device or at a vendor location, for example. In a gaming context, consumer representation 102 may be rendered wearing the selected merchandise within a gaming environment accessed from environment representation database 134, such that the game player views oneself moving within the game environment in real time wearing the selected merchandise.

In another example, selection system 106 accesses a stored consumer representation from consumer representation database 118 and selects merchandise in response to a vendor request to create rendered selections 110 for a particular selection of merchandise, such as a new line of clothing; a separate three dimensional model clip in rendered selections 110 is individualized for each consumer and emailed to each consumer, such that each consumer receives a "fashion show" of themselves in the new line of clothing.

In yet another example, selection system 106 accesses a stored consumer representation from consumer representation database 118 each time a consumer logs in at a website or requests an individualized fashion show and selects merchandise according to vendor specified selection criteria selected from vendor information database 126 and consumer specified selection criteria selected from consumer information database 124; rendered selections 110 are displayed within a video output window plugged into a website window or separate from the website window.

Further, a tracking database 140 detects rendered selections 110 and may provide tracked information from rendered selections 110 to vendor system 132 and other systems. In one example, selection rendering system 108 is in a contracted relationship to send rendered selections 110 to tracking database 140. In another example, a data mining tool (not depicted) may constantly monitor rendered selections 110 on a particular display interface, over a particular network connection, at a particular web site, at a particular computer system, or other location accessible to the data mining tool; the data mining tool stores the monitored information in tracking database 140. Thus, tracking database 140 may include tracked rendered selections across multiple store fronts, web sites and other consumer access points.

Figure 7:
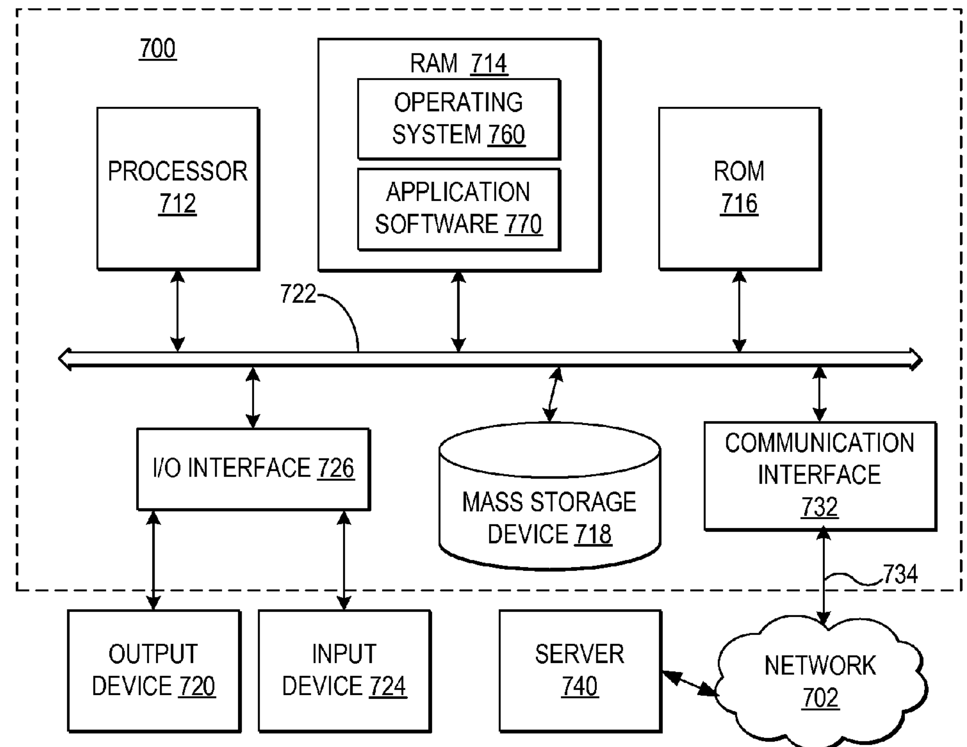
FIG. 7 is a block diagram illustrating one embodiment of a computing system in which the present invention may be implemented.

Consumer representation system 100 may be implemented within one or more stand-alone computing systems, such as computing system 700 of FIG. 7. In addition, consumer representation system 100 may be implemented in one or more computing systems, such as computing system 700, communicatively connected via a network.

With reference now to FIG. 7, a block diagram depicts one embodiment of a computing system in which the present invention may be implemented. The present invention may be executed in a variety of systems, including a variety of computing systems, such as computing system 700, communicatively connected to a network, such as network 702.

Computer system 700 includes a bus 722 or other communication device for communicating information within computer system 700, and at least one processing device such as processor 712, coupled to bus 722 for processing information. Bus 722 preferably includes low-latency and higher latency paths that are connected by bridges and adapters and controlled within computer system 700 by multiple bus controllers. When implemented as a server, computer system 700 may include multiple processors designed to improve network servicing power. Where multiple processors share bus 722, an additional controller (not depicted) for managing bus access and locks may be implemented.

Processor 712 may be a general-purpose processor such as IBM's PowerPC™ processor that, during normal operation, processes data under the control of an operating system 760, application software 770, middleware (not depicted), and other code accessible from a dynamic storage device such as random access memory (RAM) 714, a static storage device such as Read Only Memory (ROM) 716, a data storage device, such as mass storage device 718, or other data storage medium. In one example, processor 712 may further implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. It will be understood that processor 712 may implement other types of processor architectures. In addition, it is important to note that processor 712 may represent multiple processor chips connected locally or through a network and enabled to efficiently distribute processing tasks.

In one embodiment, the operations performed by processor 712 may control consumer representation building, merchandise selection, and rendering the selections on a consumer representation as depicted in the operations of flowcharts of FIGS. 13-17 and other operations described herein. Operations performed by processor 712 may be requested by operating system 760, application software 770, middleware or other code or the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 700 to perform a process according to the present invention. The term "machine-readable medium" as used herein includes any medium that participates in providing instructions to processor 712 or other components of computer system 700 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 700 can read and which is suitable for storing instructions. In the present embodiment, an example of a non-volatile medium is mass storage device 718 which as depicted is an internal component of computer system 700, but will be understood to also be provided by an external device. Volatile media include dynamic memory such as RAM 714. Transmission media include coaxial cables, copper wire or fiber optics, including the wires that comprise bus 722. Transmission media can also take the form of acoustic or light waves, such as those generated during radio frequency or infrared data communications.

Moreover, the present invention may be downloaded or distributed as a computer program product, wherein the program instructions may be transferred from a remote computer such as a server 740 to requesting computer system 700 by way of data signals embodied in a carrier wave or other propagation medium via network 702 to a network link 734 (e.g. a modem or network connection) to a communications interface 732 coupled to bus 722. In one example, where processor 712 includes multiple processor elements is, a processing task distributed among the processor elements, whether locally or via a network, may represent a consumer program product, where the processing task includes program instructions for performing a process or program instructions for accessing java objects or other executables for performing a process. Communications interface 732 provides a two-way data communications coupling to network link 734 that may be connected, for example, to a local area network (LAN), wide area network (WAN), or directly to an Internet Service Provider (ISP). In particular, network link 734 may provide wired and/or wireless network communications to one or more networks, such as network 702. Further, although not depicted, communication interface 732 may include software, such as device drivers, hardware, such as adapters, and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

Network link 734 and network 702 both use electrical, electromagnetic, or optical signals that carry digital data streams. The signals through the various networks and the signals on network link 734 and through communication interface 732, which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, a body scanning system, a keyboard, a mouse, or other input peripheral device, communicatively enabled on bus 722 via I/O interface 726 controlling inputs. In addition, for example, a display device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
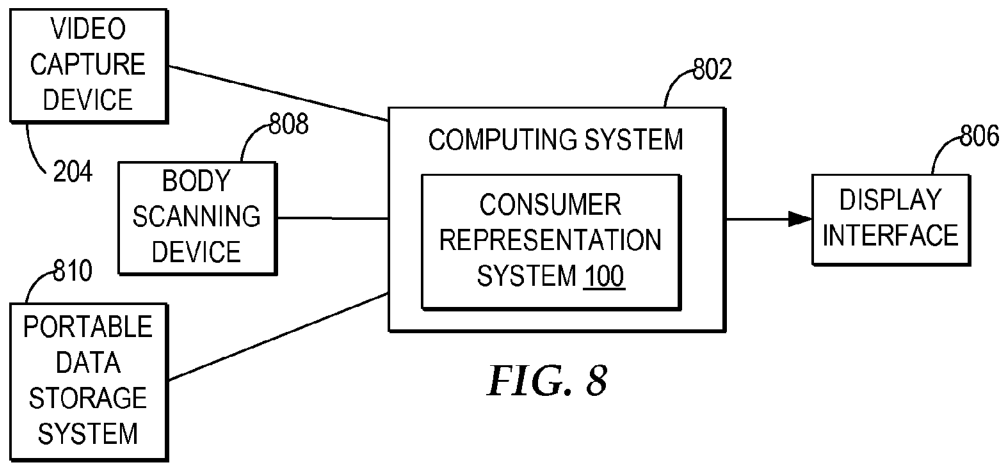
FIG. 8 is a block diagram depicting a consumer representation system implemented in a stand-alone computing system environment.

Referring now to FIG. 8, a block diagram depicts a consumer representation system implemented in a stand-alone computing system environment. In the example, a computing system 802 includes at least one of the components of consumer representation system 100 implemented within a stand-alone system, such as computing system 700. In one embodiment, computing system 802 is a single stand-alone system such as, but not limited to, a gaming system, a telephony device, a personal computing system, or an in-store console system. In another embodiment, computing system 802 includes multiple computing systems interconnected as a stand-alone computing unit. In one example, a stand-alone system may be characterized by not having a network connection; in another example, a stand-alone system may access other systems via a network connection to gather or report data or download program updates, but the stand-alone system controls performance of the processes to implement consumer representation system 100.

In the example, computing system 802 may receive input from a video capture device 804 that captures a video image of a consumer. In addition, in one embodiment, computing system 802 may receive input from a body scanning device 808 that scans for consumer body data and may provide raw scan data or analyzed sizing measurements. In yet another embodiment, video capture device 804 and body scanning device 808 may be integrated into a single input system. Further, in another embodiment, representation capture system 104 accesses a consumer representation, video clips, or sizing measurements from data stored on a portable data storage device 810 accessible to computing system 802 through a direct connection or local wireless transmission. Moreover, computing system 802 may access multiple video capture devices, each simultaneously capturing video images of different consumers or video capture device 204 may capture a video image containing multiple consumer images.

In one example, consumer representation system 100 may receive input from video capture device 204 or body scanning device 808, build a consumer representation, and enable the consumer to store the consumer representation on portable data storage device 810, such that the consumer is provided with a portable consumer representation that the consumer may provide to multiple separate consumer representation systems.

Representation capture system 104 of consumer representation system 100 detects the consumer representation related inputs, such as captured video, sizing measurements, and consumer representations and builds a current consumer representation. In addition, consumer representation system 100 may include local data storage on computing system 802 for one or more of the database components described with reference to consumer representation system 100, including previously built consumer representations.

In the example, selection rendering system 108 of consumer representation system 100 broadcasts rendered selections 110 to a display interface 806. In one example, where a "fashion mirror" is implemented, such that the consumer views the rendered selections in real time as if looking in a mirror, computing system 802 may include at least one processor element for enabling processing speeds so there is minimal delay between the point in time when the video is captured and the point in time rendered selections 110 are output to display interface 806. In addition, in a gaming context, the consumer representation may be placed into a gaming environment as a game participant and rendered wearing the selected merchandise; the processing speeds provided by a processor elements implemented with the Cell BE architecture, for example, would enable a user to view oneself virtually playing the game, but wearing the selected merchandise.

It is important to note that the exampled displayed in FIG. 8 does not imply structural limitations. For example, video capture device 804, body scanning device 808, and display interface 806 may each be a separate peripheral unit, may be combined into a single peripheral unit or may be built into computing system 802.

Figure 9:
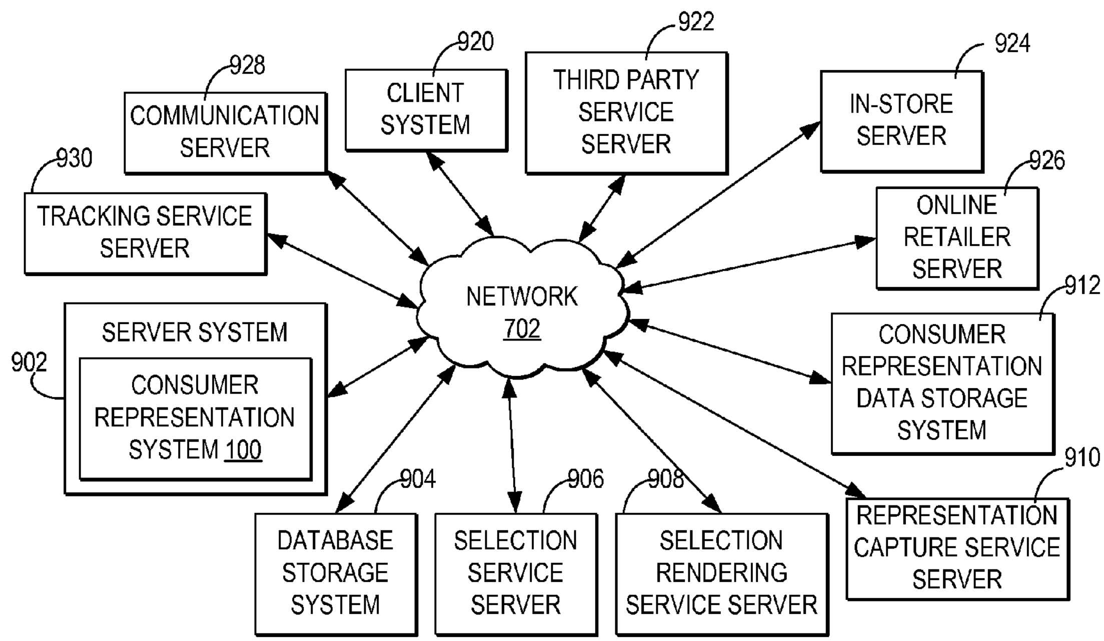
FIG. 9 is a block diagram illustrating a consumer representation system implemented within a network environment.

With reference now to FIG. 9, a block diagram depicts a consumer representation system implemented within a network environment. As illustrated, multiple systems may be communicatively connected via network 702, which is the medium used to provide communications links between various devices and computer communicatively connected. Network 702 may include permanent connections such as wire or fiber optics cables and temporary connections made through telephone connections and wireless transmission connections, for example. Network 702 may represent both packet-switching based and telephony based networks, local area and wide area networks, public and private networks. It will be understood that FIG. 9 is representative of one example of a distributed communication network for supporting a consumer representation system; however other network configurations and network components may be implemented for supporting and implementing the consumer representation system of the present invention.

The network environment depicted in FIG. 9 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, the systems depicted are representative of the types of systems and services that may be accessed or request access in implementing a consumer representation system. It will be understood that other types of systems and services and other groupings of systems and services in a network environment may implement the consumer representation system.

In one example, all or a portion of the components of consumer representation system 100 are implemented by server system 902. Server system 902 may represent one or more physical server systems with one or more processor elements. In addition, server system 902 may represent a grouping of server systems enabled to distribute processing jobs among the processor elements within the grouping.

In another example, the data storage components of consumer representation system 100 may be distributed among multiple data storage systems, including general data storage systems, such as database storage system 904, which provides access to the types of data described with reference to consumer representation system 100, and specialized storage systems, such as consumer representation data storage system 912 for holding data described with reference to consumer representation database 118. In one embodiment, a service provider may provide database storage system 904 or consumer representation data storage system 912 and control access to and storage to the storage systems.

In addition, in another example, the system components of consumer representation system 100 may be distributed among multiple service provider server systems, such as selection service server 906 for implementing selection system 106, selection rendering service server 908 for implementing selection rendering system 108, and representation capture service server 910 for implementing representation capture system 104. In addition to separate servers implementing separate component systems of consumer representation system 100, different servers may implement multiple component systems. For example, it would be advantageous for a particular service provider to implement both representation capture system 104 and selection rendering system 108 in a server system to reduce latencies in data transfers when implementing a "fashion mirror". Further, in addition to separate servers implementing separate component systems of consumer representation system 100, any of the component systems may coordinate with other component systems to perform the functions of consumer representation system 100. For example, it would be advantageous for selection service server 906 to coordinate access to consumer representation 102 and to select a selection rendering service server. Each service providers may have access to different selections of other service providers and data storage systems. Further, each service provider may use different types of load balancing and arrange different types of compensation agreements for interactions with other service providers and data storage systems.

Selection service server 906 may provide a consumer, vendor, or third party service provider with additional services for performing selection of merchandise items. For example, a consumer may subscribe to a service for selection service server 906 to monitor each day a selection of online merchandise vendors, detect new merchandise or new sales prices of merchandise, make merchandise selection 114 from the new merchandise or sale merchandise available in the consumer's size and filtered according to other selection criteria 116 and control accessing the consumer representation and building rendered selections of the consumer wearing the selected merchandise, where the rendered selections are then automatically accessible to the consumer from an email communication generated by the selection service provider.

Representation capture service server 910 may communicate locally with or communicate via a network with one or more video capture systems and body scanning systems to capture video images and body scan data of a consumer. In one implementation, representation capture service server 910 may collect captured consumer video images and body scan data, build a consumer representation, and store the consumer representation in consumer representation data storage system 912, where representation capture service server 910 sets restrictions for access to the consumer representations within consumer representation data storage system 912 by a consumer, vendor, or third party service provider. For example, a consumer may authorize representation capture service server 910 to capture and store the consumer representation and distribute the consumer representation to selected vendor systems. In another example, a consumer may agree to a service level agreement for capture and storage of the consumer representation where the consumer is allowed a particular number of accesses per month to the consumer representation by consumer selected vendors; alternatively, consumer may agree to allow a vendor to pay for additional accesses to the consumer representation under the consumer's authorization.

Each of selection service server 906, selection rendering service server 908, and representation capture server system 910 may be provided by a single provider, which may be the merchandise vendor, for example, or by multiple different service providers. By implementing data storage system 904, selection service server 906, selection rendering service server 908 and representation capture service server 910 as separate services, each service provider may negotiate a different service level agreement with a requester and multiple different service providers may compete to provide each of the types of services. Further, by implementing data storage system 904, selection service server 906, selection rendering service server 908 and representation capture service server 910 as separate services, a consumer, vendor, or third-party provider may purchase different combinations of services from different service providers. Additionally, each of selection service server 906, selection rendering service server 908, and representation capture server system 910 may act as a client to another service, where each of the services may coordinate access to the other services for a consumer rendering.

Multiple systems may request, trigger, receive, or facilitate communication of rendered selections 110. In the example, systems which request, trigger, receive, or facilitate communication of rendered selections 110 include, but are not limited to, a client system 920, a third party service server 922, an in-store server 924, and an on-line retailer server 926. It will be understood that other types of systems enabled to communicate via network 702 may also be implemented to request, trigger, receive, or facilitate communication of consumer renderings. Further, each of the component server systems, such as selection service server 906, selection rendering service server 908, and representation capture service server 910 may request, trigger, receive, or facilitate communication of rendered selections 110.

In particular, client system 920 may include a plug-in application or stand-alone application which presents a user with the option to select to trigger creation of rendered selections 110 or to negotiate for service providers to provide the consumer with the functions of consumer representation system 100. In addition, selections made by the consumer at client system 920 may be passed as real time selections 136. Further client system 920 may include a web browser through which the consumer accesses web pages for online retailers, such as retail service from online retailer server 926, or third party online services, such as third party service from third party service server 932.

An online retailer, such as online retailer server 926, may present the consumer with options for viewing rendered selections 110 within an accessed web page, within a separate window or interface or through a separate electronic communication of rendered selections 110 by an electronic communication service, such as by communication server 928. Online retailer server 926 may trigger creation of rendered selections 110 by server system 902, one of that provide consumer representation system 100. In addition, online retailer server 926 may implement consumer representation system 100, but offload requests to other service providers for all or a portion of the creation of rendered selections 110. For example, to meet performance goals where online retailer server 926 provides a "fashion mirror", online retailer server 926 may distribute to all or portions of the required processing tasks to selection rendering service server 908 which provides efficient job processor and returns the result to online retailer server 926.

In one example, whether online retailer server 926, in-store server 924, third party service server 922 or a stand alone system provides a "fashion mirror" rendering to a display interface, the vendor, service provider, consumer or other entity may specify rendering constraints that define the speed at which rendered selections 110 must be generated. A program operating on one of these computing systems may detect a rendering constraint and organize selection of computing systems available and able to generate rendered selections 110 within the rendering constraints. In one example, the program may detect computing systems with processor elements available and able to generate rendered selections 110 within the rendering constraints.

Third party service providers, implemented through third party service server 922, may include third party service providers that provide multiple services to users, such as hosting auction pages, blogs, online stores, secure payment systems, and other types of services that facilitate quick user creation of an online presence. A third party service provider may also provide for or host a provider for offering users an option to place a rendering trigger button on a web page for triggering the creation of rendered selections 110 for a particular consumer representation. In setting the rendering trigger button, the user may specify selections of consumer representations, merchandise representations, and environment representations and specify selection criteria, for application by a consumer representation system triggered by selection of the consumer rendering trigger button.

In-store server 924 may support peripheral interfaces for capturing video images or body scan data of consumers, for providing a user interface for consumers to interact to provide real time selections 136, for example, and for displaying rendered selections 110. These peripheral interfaces may be accessible within a particular store location or particular shopping venue or shared between multiple store locations. In-store server 924 may incorporate components of consumer representation system 100 locally or access components of consumer representation system 100 via network 702. In addition, in-store server 924 and online retailer server 926 may be integrated into a single server system. Further, it is important to note that in-store server 924 may be physically located at a store front location or may be remotely accessible over a network to receive inputs and output rendered selections 110. In one example, in-store server 924 may be provided by an on-demand service provider located remotely via a network, but providing the services of consumer representation system 100 to a store front location via the network.

In one example, a vendor or service provider may enable a consumer to subscribe to received rendered selections periodically in an electronic communication or other output format. For example, in-store server 924, online retailer 926, server system 902, third party service server 922, or other service providers may enable a consumer to subscriber to received rendered selections, triggered by particular conditions, with merchandise selections limited by particular preferences. When the subscribed to system detects the conditions triggered, the system triggers generation of rendered selections 110 with merchandise items selected in view of the particular preferences and delivery of rendered selections 110 to the consumer.

In another example, a vendor or service provider may enable a website with a selectable button for triggering on demand rendered selections. In one example, the website displays merchandise items and is enabled with the selectable button; consumer selection of the selectable button triggers generation of rendered selections 110 by a consumer representation system. In one embodiment, a service provider provides a selectable button that when placed on a website, enables the website with a selectable button for triggering on demand rendered selections. The service provider is called if the button is selected and the service provider handles triggering the generation and delivery of rendered selections 110.

Further, a tracking service server 930 may collect information for tracking database 140 and publish trends tracked in tracking database 140. In particular, in real time, tracking database 140 collects and sorts information from multiple instances of rendered selections 110. By collecting and storing information such as frequency of selection of each merchandise item, frequency of pairings of merchandise items, frequency of selection of particular colors, brands or styles of merchandise items, and other trackable information, tracking database 140 may be used by tracking service server 930 to predict fashion trends. Tracking service server 930 may publish tracked trends from tracking database 140 in real time or over particular periods of time so that vendors accessing the published trends may predict fashion trends and adjust inventory orders and manufacturing orders to follow a trend. Further, a tracking service server 930 may correlate particular advertisements, television shows, movie releases and other media that includes merchandise item placement with changes in fashion trends related to the placed merchandise items.

Figure 10:
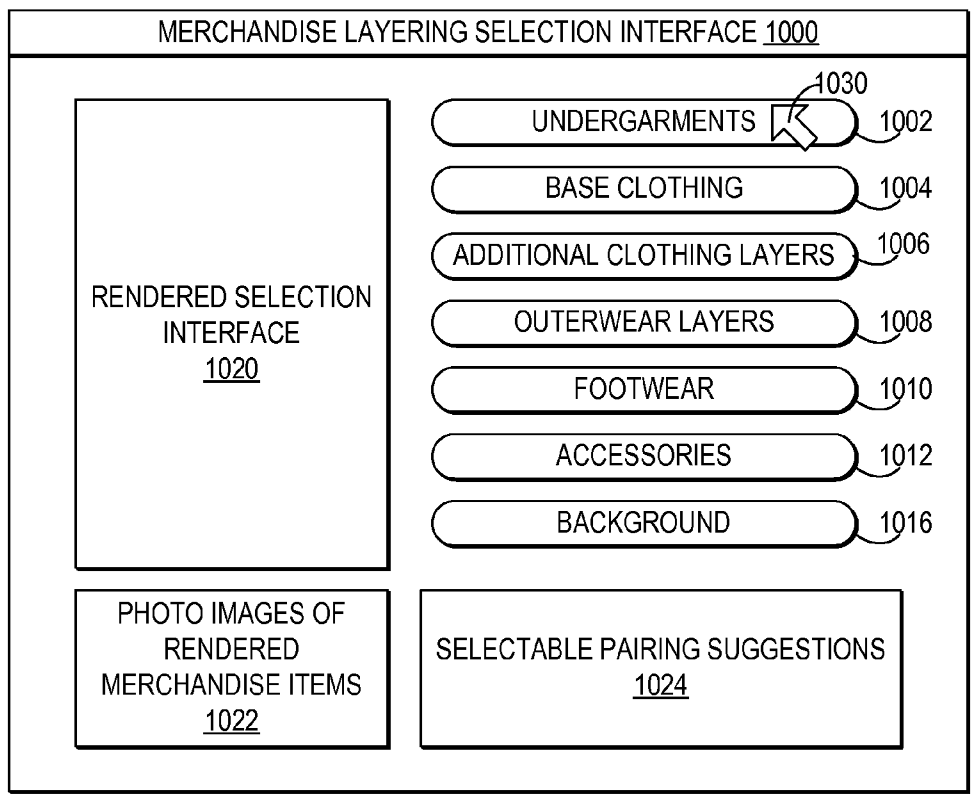
FIG. 10 is an illustrative diagram depicting a merchandise layering selection interface implementation of a consumer representation system.

With reference now to FIG. 10, an illustrative diagram depicts examples of selection options within a merchandise layering selection interface in which a consumer model wearing merchandise items is rendered. In the example, rendered selections 110 includes a three dimensional graphical rendering of a consumer wearing selected merchandise which is output in rendered selection interface 1020, photo images of rendered merchandise items which are output in interface 1022, and pairing suggestions of other merchandise items which are output in interface 1024 as selectable items.

In the example, a user may select, using placement and input with cursor 1030 or other input, from among different types of merchandise items and backgrounds for adjusting rendered selections 110 output within merchandise selection interface 1000. In selecting adjustments, a user may select from among the following selectable items: undergarments 1002, base clothing 1004, additional clothing layers 1006, outerwear layers 1008, footwear 1010, accessories 1012, background 1016, and selectable pairing suggestions 1024.

In one example, a user selection from among the selectable buttons illustrated may trigger selection system 106 to automatically select a merchandise item in the category selected or from the pairing selected and add the merchandise item to the rendering. In another example, a user selection from among the selectable buttons illustrated triggers display of another interface for selecting among the options for the type of clothing.

In particular, in the example, a user may select to add one or more layers of merchandise items and may select to change items at each layer. In particular, there are many types of merchandise items which when layered with other merchandise items, change in fit and appearance. Thus, enabling a user to select to change different layers, add layers, and cancel layers, including background layers, provides a user with a more enhanced virtual dressing room.

In selecting layers, For example, a user selection of undergarments selectable item 1002 enables a user to select undergarments to wear. By adjusting selections at the undergarment layer, the fit and movement of other merchandise layers may adjust. In addition, a user selection of base clothing selectable item 1004 enables a user to select base clothing layers, such as shirts, pants, skirts, and other clothing typically worn over undergarments. Next, a user selection of additional clothing layers selectable item 1006 enables a user to select additional clothing layers, such as a suiting layer, sweater, vest, or other layer typically worn over another layering of clothing. Further, a user selection of outerwear layers selectable item 1008 enables a user to select an outerwear layer, such as an overcoat. By enabling a user to adjust the layers worn under an overcoat, a user may view how the overcoat will fit over different combinations of layers, such as one fit over a shirt and other fit over a shirt layered with a sweater. In addition, a user selection of footwear selectable item 1010 enables a user to not only adjust a type of footwear, but to adjust a height of footwear to view merchandise items worn with footwear of different type of height. A user selection of accessories selectable item 1012 enables a user to select to add accessories including, but not limited to, belts, jewelry, hats, scarves, mittens, stockings, and socks.

Further, in the example, a user may select to adjust a background by selecting background selectable item 1016. A user may select from among multiple background environments, such as user provided backgrounds, vendors provided backgrounds, third party provider backgrounds. As previously described, a vendor may solicit third parties to purchase the option to show a particular background, such that the user is only able to select from among the third party backgrounds.

Figure 11:
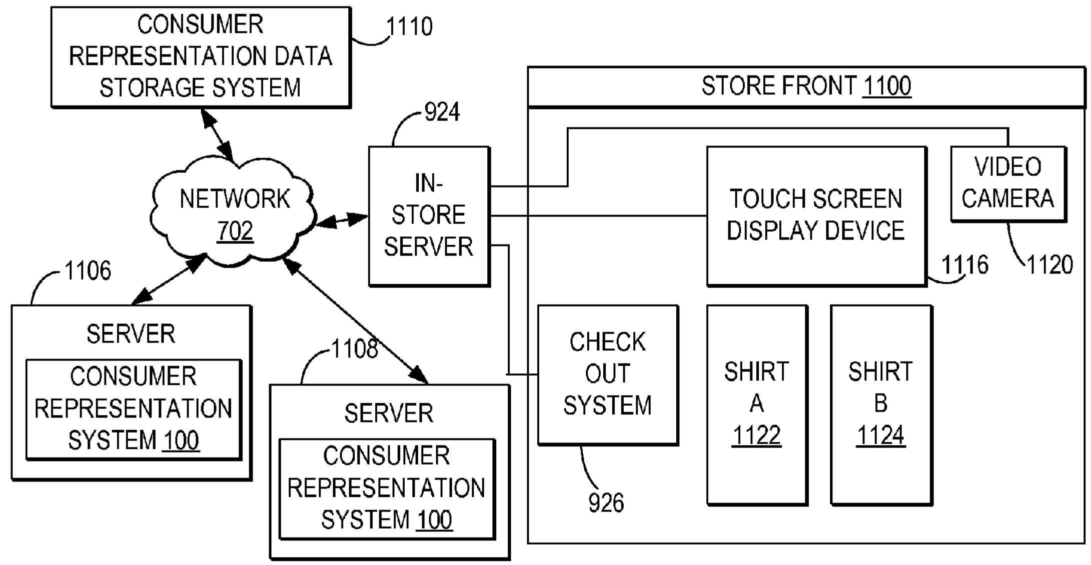
FIG. 11 is an illustrative diagram depicting one embodiment of a store front implementation of a consumer representation system.

With reference now to FIG. 11, an illustrative diagram depicts one embodiment of a store front implementation of a consumer representation system. As illustrated, a store front area 1100 includes at least one touch screen display device 1116 and at least one video camera 1120. Different zones of store front 1100 may include additional touch screen or regular display devices and video cameras.

Each zone within store front 1100 may include particular merchandise items. In the example, the zone depicted includes shirt A as illustrated at reference numeral 1122 and shirt B as illustrated at reference numeral 1124.

In one embodiment, as a consumer approaches the zone depicted, a video image of the consumer is captured at video camera 1120 and transmitted to in-store server 924. In addition, in-store server system may detect information selected by a consumer at touch screen display device 1116. It will be understood that in alternate embodiments, a regular display device may be implemented and other input peripherals provided to consumers with which to provide selections and other inputs.

In one example, a consumer selects a consumer identifier at touch screen display device 1116. In-store server 924 uses the consumer identifier to access a consumer representation, and in particular a body scan, of the consumer from consumer representation data storage system 1110. In an alternate embodiment, the consumer may carry a portable data storage system detectable a detection device communicatively within store front 1100 connected to in-store server 924, where the detection device detects a consumer identifier or consumer representation from the portable data storage system. Further, in yet another embodiment, store front 1100 may include a body scanning device that captures a body scan when the consumer is in the store.

According to an advantage, merchandise within the each zone of a store front is identified for in-store server 924 according to zone. In addition, in-store server 924 may track inventory availability according to zone. Thus, as in-store server 924 detects a consumer within the capture area of video camera 1120 and accesses a body scan and other consumer representation information for the consumer to detect consumer sizing measurements, in-store server 924 coordinates selecting merchandise from the current zone that is available and is in the consumer's size and fit preferences and rendering the consumer representation wearing the selected merchandise for display at touch screen display device 1116. In the example, a consumer standing in the capture area of video camera 1120 would see touch screen display device 1116 as a "fashion mirror" where one or more of the merchandise items, such as shirt A or shirt B, are rendered on the video image of the consumer captured as the consumer stands in front of the merchandise displayed. As the consumer moves to a different zone of the store front, in front of a different display device, in-store server 924 would coordinate selection of merchandise items from that zone and rendering selections output to the display within that zone. In addition, once video is captured for the consumer and sizing measurements are accessed, as the consumer walks around the store, in-store server 924 may coordinate replaying the same consumer representation, but with merchandise selected from a different zone.

In one embodiment, in-store server 924 may provide all or portions of consumer representation system 100, where in-store server 924 may be physically located locally to a store front or remotely accessible over a network. In addition, however, according to an advantage, in-store server 924 may offload portions of the performance of consumer representation system 100 to one or more servers 1106 and 1108. Servers 1106 and 1108 represent servers that include processor elements enabled to efficiently build consumer representation 102 and generate rendered selections 110 for output to touch screen display device 1116. In-store server 924 may specify a rendering constraint that requires selection of processor elements able to build consumer representation 102 and generate rendered selections 110 within a particular time period, such that rendered selections 110 are displayed to provide the "fashion mirror" effect. In particular, where different zones within store front 1100 include separate display devices and video cameras, in-store server 924 may offload the captured video, sizing measurements, and merchandise selections to servers 1106 and 1108 for the servers to build consumer representations and generate rendered selections through the available processor elements.

In addition to providing a "fashion mirror" for consumers to select merchandise for the consumer and render the video image of the consumer wearing the selected merchandise, a store front may provide additional options to the consumer. For example, rather than having to pick up merchandise and take the merchandise to a dressing room, once the consumer sees a rendered selection of the consumer wearing particular merchandise, the consumer may select to try on or purchase the items, receive a fitting room assignment or register assignment, and arrive at the assigned location to receive the merchandise selections for personal fitting or purchase.

Further, in addition to providing a display of rendered selections 110 within a store front, a store front location may include a printer or send rendered selections 110 to a printer service for generating a print out of one or more frames of rendered selections 110. In one example, within a multi-store area, a printer service may receive rendered selections 110 over a network to produce print renderings of rendered selections 110 through a single service.

Information about consumer responses to rendered selections is tracked through selections or non-selections at touch screen display device 1116 and through purchases made and tracked by check out system 1126. In particular, check out system 1126 may detect the consumer associated with each purchase; in-store server 924 detects whether the consumer was shown a rendered selection of each item purchased and in-store server 924 detects which merchandise items the consumer was shown in a rendered selection but that the consumer did not purchase. Collected information may be passed to a consumer information database according to the consumer ID and to one or more vendor information databases.

Figure 12:
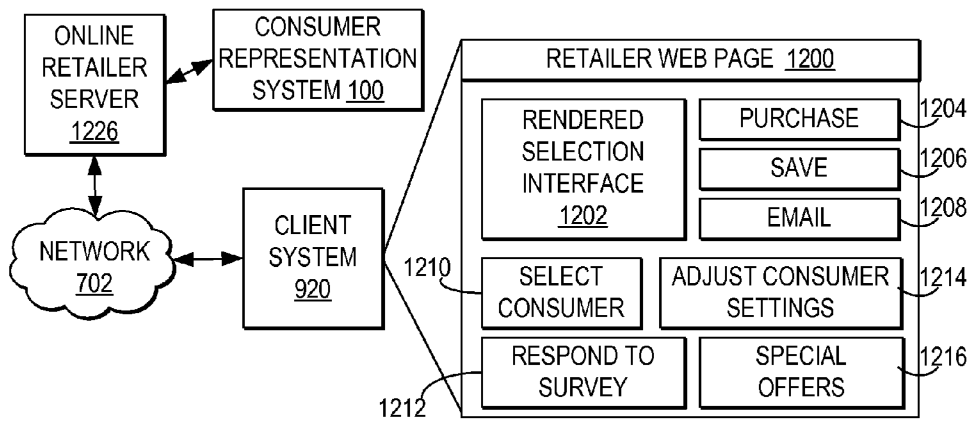
FIG. 12 is an illustrative diagram illustrating one embodiment of an online store implementation of a consumer representation system.

Referring now to FIG. 12, an illustrative diagram depicts one embodiment of an online store implementation of a consumer representation system. As illustrated, a client system 920 is communicatively connected via network 702 to online retailer server 926. Online retailer server 926 accesses consumer representation system 100 and provides rendered selections 110, as previously described. In one example, online retailer server 926 access consumer representation system 100 via network 702 via a single or multiple service providers or from an enterprise system clustered with online retailer server 926. A consumer at client system 920 communicates with online retailer server 926 via a retailer web page 1200 received and output by client system 920 within an output interface (not depicted).

In one embodiment, the online retailer may include, within a webpage, a display area for rendered selections 110 or may open a separate window for streaming rendered selections 110. The online retailer may also provide the consumer with options for triggering rendered selections, viewing rendered selections, responding to rendered selections and adjusting rendered selections. It is important to note that the current consumer may be another user who is not the same as the consumer represented in the rendered selections.

In the example, the consumer views rendered selections 110 within a rendered selection interface 1202 of retailer web page 1200. Additionally, retailer web page 1200 includes selectable options for the consumer, including selectable buttons 1204 to purchase, 1206 to save, and 1208 to email. By selecting button 1204 to purchase, the merchandise items displayed within rendered selection interface 1202 are automatically added to the consumer's electronic shopping cart or automatically purchased, depending on consumer shopping preferences and electronic commerce options provided. By selecting button 1206 to save, rendered selections 110 and the merchandise item specifications currently displayed are stored either at client system 920, such as in a cookie, or by online retailer server 926, such as in a consumer wish list. By selecting button 1208 to email, the consumer may be prompted to select email addresses or a consumer's preferences may specify the email addresses to which the clip of the displayed selections in rendered selection interface 1202 is to be emailed. In addition, other types of communication transmission may be offered.

In addition, in the example, retailer web page 1200 includes a selectable button 1210 to select a consumer representation. In particular, the consumer logged in to the online retailer web site need not be the same as the consumer whose representation is selected and displayed within rendered selection interface 1202 wearing selected merchandise. A consumer may identify one or more consumer IDs and request that the online retailer render selections for these consumers individually or as a group.

In the example, in addition, retailer web page 1200 includes a selectable button 1214 for a consumer to adjust consumer settings. In particular, the consumer may be the consumer or an authorized agent of the consumer, such as a parent, where the consumer may then select to adjust the settings in a consumer representation and in consumer information.

In addition, in the example, retailer web page 1200 includes a selectable button 1212 to select to respond to a survey in association with rendered selections 110. In an alternate embodiment, the online retailer may automatically present a consumer with an online survey and require completion of the survey before the online retailer will provide any additional rendered selections to the consumer within rendered selection interface 1202. In another embodiment, the request to respond to a survey may be displayed in a separate window or in an alternate communication to the consumer, such as an email.

In the example, in addition, retailer web page 1200 includes a selectable button 1216 to select to view special offers in association with the merchandise items displayed within rendered selection interface 1202, in association with merchandise previously displayed in rendered selections 110, or other special offers related to rendered selections 110. In an alternate embodiment, the online retailer may automatically display special offers in association with the merchandise items in an option to purchase the selected merchandise items.

Any consumer inputs or selections of the buttons on retailer web page 1200 are passed as records via network 702 to online retailer server 926 for storage in consumer representation databases, consumer information databases, and vendor information databases.

Figure 13:
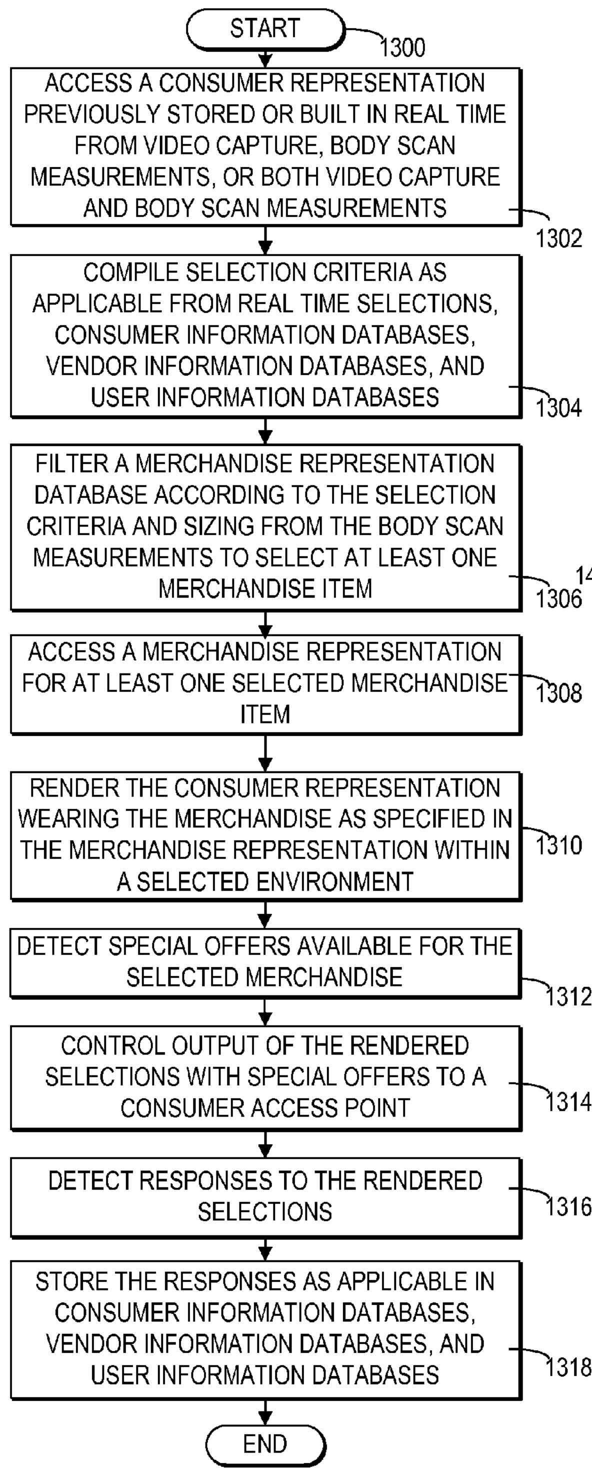
FIG. 13 is a high level logic flowchart depicting a process and program for controlling a consumer representation system.

With reference now to FIG. 13, a high level logic flowchart depicts a process and program for controlling a consumer representation system. As illustrated, the process starts at block 1300 and thereafter proceeds to block 1302. Block 1302 depicts accessing a consumer representation previously stored or built in real time from video capture, body scan measurements, or both video capture and body scan measurements. Next, block 1304 illustrates compiling selection criteria as applicable from real time selections, consumer information databases, vendor information databases, and user information databases. Thereafter, block 1306 depicts filtering a merchandise representation database with merchandise representations for multiple merchandise items according to the selection criteria and sizing based on the body scan measurements in the consumer representation, to select at least one merchandise item, and the process passes to block 1308.

Block 1308 illustrates accessing a merchandise representation for at least one selected merchandise item. Next, block 1310 depicts rendering the consumer representation wearing the merchandise as specified in the merchandise representation within a selected environment. Thereafter, block 1312 illustrates detecting special offers available for the selected merchandise. In one embodiment, the vendor information database includes the special offers, such that the selection system is enabled to detect and output special offers. In another embodiment, a vendor or other authorized entity may monitor merchandise selections and dynamically create special offers.

Next, block 1314 illustrates controlling output of the rendered selections to a consumer access point. In addition, the rendered selections may be transmitted to a tracking service. Next, block 1316 depicts detecting responses to the rendered selections and block 1318 illustrates storing the responses as applicable in consumer information databases vendor information databases and user information databases.

It is important to note that each block of the process depicted may be performed within a single computing system or distributed across multiple computing systems and performed by a single functional entity or by multiple entities, including service providers.

Figure 14:
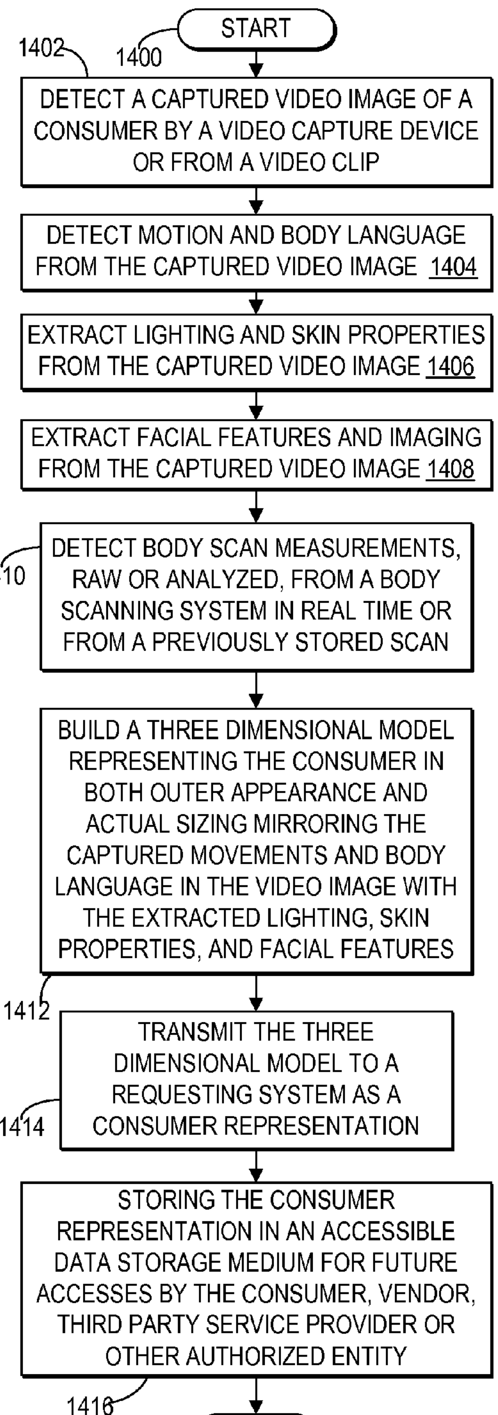
FIG. 14 is a high level logic flowchart illustrating a process and program for controlling the building and access to a consumer representation in a consumer representation system.

Referring now to FIG. 14, a high level logic flowchart depicts a process and program for controlling the building and access to a consumer representation in a consumer representation system. As depicted, the process starts at block 1400 and thereafter proceeds to block 1402. Block 1402 illustrates detecting a captured video image of a consumer by a video capture device in real time or from a video clip or other video file. Next, block 1404 depicts capturing motion and body language from the captured video. Thereafter, block 1406 illustrates extracting lighting and skin properties from the captured video. Next, block 1408 depicts extracting facial features and imaging from the captured video, and the process passes to block 1410.

Block 1410 depicts detecting body scan measurements, raw or analyzed, from a body scanning system in real time or from a previously stored scan. Thereafter, block 1412 illustrates building a three dimensional model representing the consumer in both outer appearance based on the extracted lighting, skin properties, and facial features and actual sizing and mirroring the captured movements and body language in the video image. It is important to note that a video image may include multiple consumers or a consumer may request to merge multiple video images into a single consumer representation. A separate three dimensional model may be built and adjusted based on body scan measurements for each separate consumer.

Next, block 1414 depicts that transmitting the three dimensional model as the consumer representation to a requesting system for output or further rendering wearing selected merchandise. Thereafter, block 1416 illustrates storing the consumer representation in an accessible data storage medium for future accesses by the consumer, vendor, third party service provider, or other authorized entity. In addition, a consumer may be prompted to provide additional information, such as restriction preferences for a consumer representation, which are stored in an entry with the consumer representation.

Figure 15:
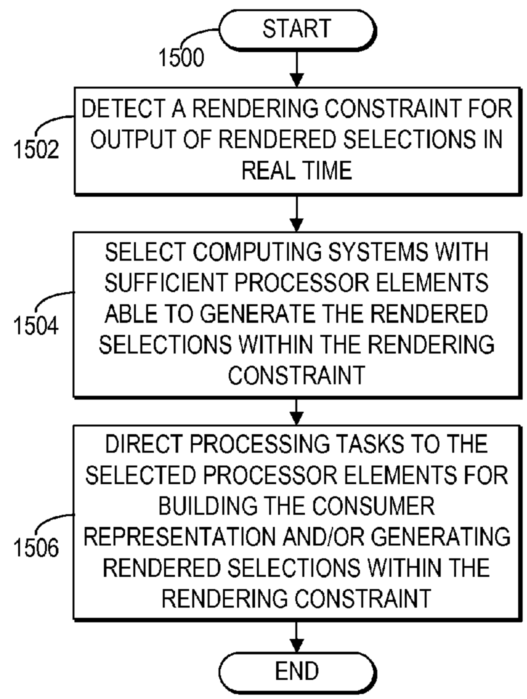
FIG. 15 is a high level logic flowchart depicting a process and program for rendering selections within rendering constraints in a distributed processing environment.

With reference now to FIG. 15, a high level logic flowchart illustrates a process and program for rendering selections within rendering constraints in a distributed processing environment. As illustrated, the process starts at block 1500 and thereafter proceeds to block 1502. Block 1502 illustrated detecting a rendering constraint for output of rendered selections in real time. A rendering constraint may be specified according to time or other criteria. The rendering constraint may be accessed from a consumer selection or consumer preferences, vendor preferences, or a service level agreement, for example. Block 1504 depicts selecting computing systems with processor elements able to generate the rendered selections within the rendering constraint. Thereafter, block 1506 illustrates directing processing tasks to the selected processor elements for building the consumer representation and/or generating rendering selections within the rendering constraints, and the process ends. In one example, the process specified in FIG. 15 may be performed by multiple types of processes including, but not limited to, middleware, java applets and cell processor control code at multiple types of systems, including stand alone systems and networked systems.

Figure 16:
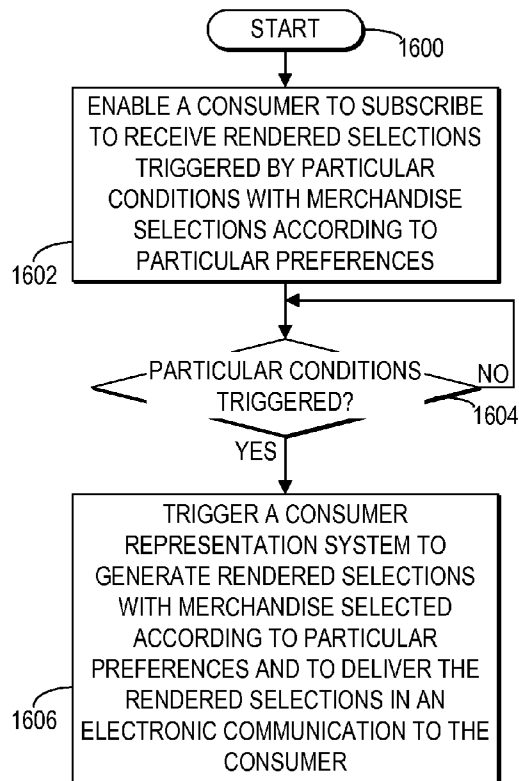
FIG. 16 is a high level logic flowchart illustrating a process and program for controlling subscription based rendered selections.

Referring now to FIG. 16, a high level logic flowchart depicts a process and program for controlling subscription based rendered selections. In the example, the process starts at block 1600 and thereafter proceeds to block 1602. Block 1602 illustrates enabling a consumer to subscribe to receive rendered selections triggered by particular conditions with merchandise selections made according to particular preferences. For example, a consumer may subscribe to receive rendered selections each month with merchandise selections made from among merchandise provided by a selection of vendors for purchase at an assortment of online stores. Next, block 1604 depicts a determination whether the particular conditions for a consumer subscription are triggered. If the conditions are triggered, then the process passes to block 1606. Block 1606 illustrates triggering a consumer representation system to generate rendered selection with merchandise selected according to the particular preferences and to deliver the rendered selection in an electronic communication to the consumer, and the process ends. It will be understood that in alternate embodiments, other types of output to the consumer may be specified. Further, it is important to note that, FIG. 16 may be performed by different entities including, but not limited to, a vendor or a third party service provider.

With reference now to FIG. 15, a high level logic flowchart illustrates a process and program for rendering selections within rendering constraints in a distributed processing environment. In the example, the process starts at block 1500 and thereafter proceeds to block 1502. Block 1502 depicts detecting a rendering constraint for output of rendered selections in real time. Next, block 1504 illustrates selecting computing systems with sufficient processor elements able to generate the rendered selections within the rendering constraint. Thereafter, block 1506 depicts directing processing tasks to the selected processor elements for building the consumer representation and/or generating rendered selections within the rendering constraint, and the process ends.

With reference now to FIG. 16, a high level logic flowchart illustrates a process and program for controlling subscription based rendered selections. In the example, the process starts at block 1600 and thereafter proceeds to block 1602. Block 1602 depicts enabling a consumer to subscribe to receive rendered selections triggered by particular conditions with merchandise selections according to particular preferences. Next, block 1604 depicts a determination whether particular conditions are triggered. Once particular conditions are triggered, the process passes to block 1606. Block 1606 depicts triggering a consumer representation system to generate rendered selections with merchandise selected according to particular preferences and to deliver the rendered selections in an electronic communication to the consumer, and the process ends.

Figure 17:
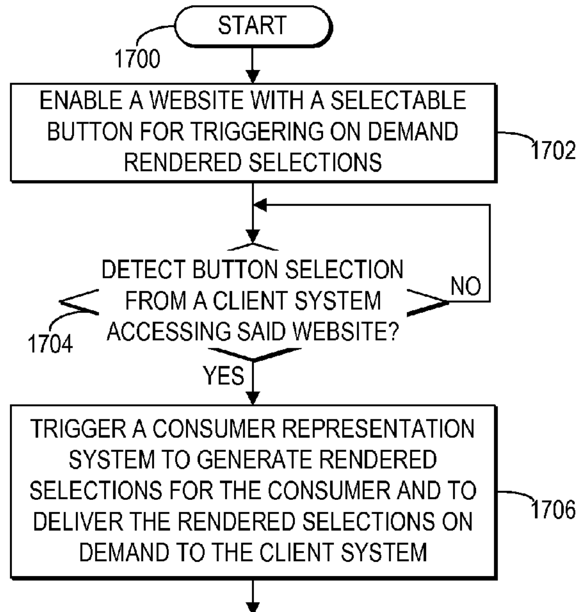
FIG. 17 is a high level logic flowchart depicting a process and program for controlling consumer triggered on demand rendered selections.

With reference now to FIG. 17, a high level logic flowchart illustrates a process and program for controlling consumer triggered on demand rendered selections. In the example, the process starts at block 1700 and thereafter proceeds to block 1702. Block 1702 depicts enabling a website with a selectable button for triggering on demand rendered selections. It is important to note that in addition to or as an alternative to enabling a website with a selectable button, other types of selectable triggers may be added to a website or a selectable trigger may be added to an application interface of a plug-in application or other type of application distributed to a client system or accessed via a network. Next, block 1704 illustrates a determination whether a button selection from a client system accessing said website is detected. When a button selection is detected, the process passes to block 1706. Block 1706 depicts triggering a consumer representation system to generated rendered selections for the consumer and to deliver the rendered selections to the client system on demand, and the process ends. It is important to note that a service provider may perform the process described in FIG. 17.

While the invention has been particularly shown and described with reference to a preferred embodiment, it will be understood by those skilled in the art that various changes in form and detail may be made therein without departing from the spirit and scope of the invention

What is claimed is:

1. A system for virtually rendering a consumer image wearing at least one merchandise item, comprising:

at least one computing system comprising at least one processor element and at least one memory system;

said computing system operative to access a plurality of data points detected from a scan of a consumer body shape of a consumer by a body scanning device;

said computing system operative to calculate a selection of sizing measurements and a three dimensional shape of said consumer from said plurality of data points;

said computing system operative to access a captured video stream with an image of said consumer comprising a movement;

said computing system operative to graphically map said movement of said image of said consumer within said captured video stream;

said computing system operative to extract, from said captured video stream, at least one from among at least one facial feature, at least one skin texture characteristics, and at least one lighting characteristic;

said computing system operative to generate said three dimensional model rendered to depict said consumer appearance and movement from said selection of sizing measurements, said three dimensional shape, said graphical mapping of said movement, and at least one from among said facial feature, said skin texture characteristic, and said lighting characteristic;

said computing system operative to generate a consumer representation of said consumer comprising a three dimensional model rendered to depict said consumer appearance and said movement in each frame of said captured video stream and specified by said selection of sizing measurements, said three dimensional shape, said graphical mapping of said movement, and at least one from among said facial feature, said skin texture characteristic, and said lighting characteristic;

said computing system operative to store said consumer representation by a selection service;

said computing system operative to receive a consumer subscription to said selection service to monitor a plurality of online merchandise vendors;

said computing system operative to monitor, by said selection service, said plurality of online merchandise vendors;

said computing system operative to detect, by said selection service, a plurality of new separate merchandise items added by at least one of said online merchandise vendors to a current inventory of merchandise items;

said computing system operative to select, by said selection service, at least one particular merchandise item from among said plurality of new separate merchandise items each with a separate set of merchandise characteristics of a size selected to fit said selection of sizing measurements;

said computing system operative to access, by said selection service, said consumer representation stored by said selection service;

said computing system operative to render said selected at least one particular merchandise item on each rendered frame of said three dimensional model according to said separate set of merchandise characteristics as applied to said selection of sizing measurements, wherein a display of said rendered three dimensional model shows a realistic image of said consumer appearance and said movement as captured in said video stream and wearing said particular merchandise item; and said computing system operative to generate an email communication to said consumer from which said rendering is accessible to said consumer.

2. The system according to claim 1, further comprising:

said computing system operative to select a rendering time constraint for a maximum time between capture of each said frame of said captured video stream and said rendering of a corresponding frame in said rendered three dimensional model wearing said particular merchandise item;

said computing system operative to select a particular selection of processor elements accessible to said at least one computing system, wherein said particular selection of processor element is enabled to meet said rendering time constraint;

said computing system operative to build said consumer representation through said selected particular selection of processor elements comprising said three dimensional model as said captured video stream is received in real time at said computing system; and said computing system operative to render said particular merchandise item on each said rendered frame of said three dimensional model by said computing system within said rendering time constraint for delivery to a display interface, such that said display of said rendering appears to said consumer as if said consumer is looking into a mirror when viewing said rendering at said display interface.

3. The system according to claim 1, wherein said computing system operative to access a consumer representation further comprises:

said computing system operative to access a consumer representation database comprising a plurality of separate consumer representations associated with a particular consumer identifier, wherein each of said plurality of consumer representations was previously rendered based on a separate captured video stream and a plurality of data points captured in said scan of said consumer body shape, wherein each of said plurality of consumer representation is identified by motion type; and said computing system operative to select to access at least one of said plurality of consumer representations.

4. The system according to claim 1, wherein said computing system operative to select at least one particular merchandise item further comprises:

said computing system operative to compile at least one selection criteria from accessing at least one from among a consumer information database comprising at least one merchandise preferences for said consumer captured in said consumer representation, a vendor information database comprising at least one merchandise preference for at least one vendor of at least one of said plurality of merchandise items, and real time selections by a user accessing said rendering; and said computing system operative to select said plurality of separate merchandise items from among a database of a plurality of merchandise representation entries for said at least one vendor, wherein said plurality of separate merchandise items match said selection criteria.

5. The system according to claim 1, further comprising:

said computing system operative to access said consumer representation, wherein said consumer representation comprises a three dimensional model rendered to depict a consumer appearance and movement indicates a particular range of motion;

said computing system operative to select said at least one particular merchandise item from among said plurality of separate merchandise items each with said separate set of merchandise characteristics of said size selected to fit said selection of sizing measurements and to fit said particular range of motion; and said computing system operative to render said at least one particular merchandise item on each rendered frame of said three dimensional model according to said separate set of merchandise characteristics as applied to said selection of sizing measurements and said particular range of motion.

6. The system according to claim 1, further comprising:

said computing system operative to detect at least one response by a consumer to said rendering, wherein said at least one response comprises at least one from among a purchase of said particular merchandise, a selection to view said particular merchandise, a consumer request to save said rendering, a consumer request to send said rendering in an electronic communication, and at least one consumer response to a survey prompted in association with said rendering; and said computing system operative to store said response in at least one from among a consumer information database for compiling a history of responses by a particular consumer and a vendor information database for compiling a history of responses by a plurality of consumer, wherein stored responses are accessible for determining at least one from among future selections from among said plurality of merchandise items and future merchandise production criteria.

7. The system according to claim 1, wherein said computing system operative to render said particular merchandise item on each rendered frame of said three dimensional model according to said separate set of merchandise characteristics as applied to said selection of sizing measurements, further comprises:

said computing system operative to select a particular display environment from among a plurality of available display environments; and said computing system operative to render said particular merchandise item with each rendered frame of said three dimension model within said display environment.

8. A program for virtually rendering a consumer image wearing at least one merchandise item, said program embodied in a non-transitory computer-readable storage medium, said program comprising computer-executable instructions which cause a computer to:

control access to a plurality of data points detected from a scan of a consumer body shape of a consumer by a body scanning device;

calculate a selection of sizing measurements and a three dimensional shape of said consumer from said plurality of data points;

access a captured video stream with an image of said consumer comprising a movement;

graphically map said movement of said image of said consumer within said captured video stream;

extract, from said captured video stream, at least one from among at least one facial feature, at least one skin texture characteristics, and at least one lighting characteristic;

generate said three dimensional model rendered to depict said consumer appearance and movement from said selection of sizing measurements, said three dimensional shape, said graphical mapping of said movement, and at least one from among said facial feature, said skin texture characteristic, and said lighting characteristic;

generate a consumer representation of said consumer comprising a three dimensional model rendered to depict said consumer appearance and said movement in each frame of said captured video stream and specified by said selection of sizing measurements, said three dimensional shape, said graphical mapping of said movement, and at least one from among said facial feature, said skin texture characteristic, and said lighting characteristic;

store said consumer representation by a selection service;

receive a consumer subscription to said selection service to monitor a plurality of online merchandise vendors;

monitor, by said selection service, said plurality of online merchandise vendors;

detect, by said selection service, a plurality of new separate merchandise items added by at least one of said online merchandise vendors to a current inventory of merchandise items;

select, by said selection service, at least one particular merchandise item from among said plurality of new separate merchandise items each with a separate set of merchandise characteristics of a size selected to fit said selection of sizing measurements;

access, by said selection service, said consumer representation stored by said selection service;

render said selected at least one particular merchandise item on each rendered frame of said three dimensional model according to said separate set of merchandise characteristics as applied to said selection of sizing measurements, wherein a display of said rendered three dimensional model shows a realistic image of said consumer appearance and said movement as captured in said video stream and wearing said particular merchandise item; and generate an email communication to said consumer from which said rendering is accessible to said consumer.

9. The program according to claim 8, said program comprising computer-executable instructions which further cause a computer to:

select a rendering time constraint for a maximum time between capture of each said frame of said captured video stream and said rendering of a corresponding frame in said rendered three dimensional model wearing said particular merchandise item;

select a particular selection of processor elements accessible to said at least one computing system, wherein said particular selection of processor element is enabled to meet said rendering time constraint;

build said consumer representation through said selected particular selection of processor elements comprising said three dimensional model as said captured video stream is received in real time at said computing system; and render said particular merchandise item on each said rendered frame of said three dimensional model by said computing system within said rendering time constraint for delivery to a display interface, such that said display of said rendering appears to said consumer as if said consumer is looking into a mirror when viewing said rendering at said display interface.

10. The program according to claim 8, said program comprising computer-executable instructions which further cause a computer to:

access a consumer representation database comprising a plurality of separate consumer representations associated with a particular consumer identifier, wherein each of said plurality of consumer representations was previously rendered based on a separate captured video stream and a plurality of data points captured in said scan of said consumer body shape, wherein each of said plurality of consumer representation is identified by motion type; and select to access at least one of said plurality of consumer representations.

11. The program according to claim 8, said program comprising computer-executable instructions which further cause a computer to:

compile at least one selection criteria from accessing at least one from among a consumer information database comprising at least one merchandise preferences for said consumer captured in said consumer representation, a vendor information database comprising at least one merchandise preference for at least one vendor of at least one of said plurality of merchandise items, and real time selections by a user accessing said rendering; and select said plurality of separate merchandise items from among a database of a plurality of merchandise representation entries for said at least one vendor, wherein said plurality of separate merchandise items match said selection criteria.

12. The program according to claim 8, said program comprising computer-executable instructions which further cause a computer to:

access said consumer representation, wherein said consumer representation comprises a three dimensional model rendered to depict a consumer appearance and movement indicates a particular range of motion;

select said at least one particular merchandise item from among said plurality of separate merchandise items each with said separate set of merchandise characteristics of said size selected to fit said selection of sizing measurements and to fit said particular range of motion; and render said at least one particular merchandise item on each rendered frame of said three dimensional model according to said separate set of merchandise characteristics as applied to said selection of sizing measurements and said particular range of motion.

13. The program according to claim 8, said program comprising computer-executable instructions which further cause a computer to:

detect at least one response by a consumer to said rendering, wherein said at least one response comprises at least one from among a purchase of said particular merchandise, a selection to view said particular merchandise, a consumer request to save said rendering, a consumer request to send said rendering in an electronic communication, and at least one consumer response to a survey prompted in association with said rendering; and store said response in at least one from among a consumer information database for compiling a history of responses by a particular consumer and a vendor information database for compiling a history of responses by a plurality of consumer, wherein stored responses are accessible for determining at least one from among future selections from among said plurality of merchandise items and future merchandise production criteria.

14. The program according to claim 8, said program comprising computer-executable instructions which further cause a computer to:

select a particular display environment from among a plurality of available display environments; and render said particular merchandise item with each rendered frame of said three dimension model within said display environment.

15. A system for virtually rendering a consumer image wearing at least one merchandise item, comprising:

at least one computing system comprising at least one processor element and at least one memory system;

said computing system comprising means for accessing a plurality of data points detected from a scan of a consumer body shape of a consumer by a body scanning device;

said computing system comprising means for calculating a selection of sizing measurements and a three dimensional shape of said consumer from said plurality of data points;

said computing system comprising means for accessing a captured video stream with an image of said consumer comprising a movement;

said computing system comprising means for graphically mapping said movement of said image of said consumer within said captured video stream;

said computing system comprising means for extracting, from said captured video stream, at least one from among at least one facial feature, at least one skin texture characteristics, and at least one lighting characteristic;

said computing system comprising means for generating said three dimensional model rendered to depict said consumer appearance and movement from said selection of sizing measurements, said three dimensional shape, said graphical mapping of said movement, and at least one from among said facial feature, said skin texture characteristic, and said lighting characteristic;

said computing system comprising means for generating a consumer representation of said consumer comprising a three dimensional model rendered to depict said consumer appearance and said movement in each frame of said captured video stream and specified by said selection of sizing measurements, said three dimensional shape, said graphical mapping of said movement, and at least one from among said facial feature, said skin texture characteristic, and said lighting characteristic;

said computing system comprising means for storing said consumer representation by a selection service;

said computing system comprising means for receiving a consumer subscription to said selection service to monitor a plurality of online merchandise vendors;

said computing system comprising means for monitoring, by said selection service, said plurality of online merchandise vendors;

said computing system comprising means for detecting, by said selection service, a plurality of new separate merchandise items added by at least one of said online merchandise vendors to a current inventory of merchandise items;

said computing system comprising means for selecting, by said selection service, at least one particular merchandise item from among said plurality of new separate merchandise items each with a separate set of merchandise characteristics of a size selected to fit said selection of sizing measurements;

said computing system comprising means for accessing, by said selection service, said consumer representation stored by said selection service;

said computing system comprising means for rendering said selected at least one particular merchandise item on each rendered frame of said three dimensional model according to said separate set of merchandise characteristics as applied to said selection of sizing measurements, wherein a display of said rendered three dimensional model shows a realistic image of said consumer appearance and said movement as captured in said video stream and wearing said particular merchandise item; and said computing system comprising means for generating an email communication to said consumer from which said rendering is accessible to said consumer.

* * * * *